(12) United States Patent
Hosokawa et al.

(10) Patent No.: US 8,508,962 B2
(45) Date of Patent: Aug. 13, 2013

(54) POWER CONVERSION APPARATUS

(75) Inventors: Yasuhiko Hosokawa, Minato-ku (JP); Toshifumi Ise, Suita (JP); Hirotake Nakaji, Minato-ku (JP)

(73) Assignee: Toshiba Mitsubishi-Electric Industrial Systems Corporation, Tokyo (JP)

( * ) Notice: Subject to any disclaimer, the term of this patent is extended or adjusted under 35 U.S.C. 154(b) by 0 days.

(21) Appl. No.: 13/497,168

(22) PCT Filed: Apr. 15, 2010

(86) PCT No.: PCT/JP2010/056758
§ 371 (c)(1),
(2), (4) Date: Mar. 20, 2012

(87) PCT Pub. No.: WO2011/036912
PCT Pub. Date: Mar. 31, 2011

(65) Prior Publication Data
US 2012/0182772 A1    Jul. 19, 2012

(30) Foreign Application Priority Data
Sep. 24, 2009 (WO) .................. PCT/JP2009/066494

(51) Int. Cl.
*H02H 7/122* (2006.01)
*H02M 3/335* (2006.01)

(52) U.S. Cl.
USPC .......................................... 363/56.01; 363/16

(58) Field of Classification Search
USPC ................... 363/16, 17, 24–27, 56.01–56.02, 363/56.06–56.08, 95, 98, 131–133, 135, 363/136, 139
See application file for complete search history.

(56) References Cited

U.S. PATENT DOCUMENTS

| | | | | |
|---|---|---|---|---|
| 4,276,588 A | * | 6/1981 | McLyman et al. | 363/24 |
| 5,198,969 A | * | 3/1993 | Redl et al. | 363/17 |
| 5,513,088 A | * | 4/1996 | Williamson | 363/21.18 |
| 6,366,474 B1 | * | 4/2002 | Gucyski | 363/20 |
| 7,158,389 B2 | * | 1/2007 | Yasumura | 363/17 |
| 7,706,161 B2 | * | 4/2010 | Quazi | 363/89 |
| 7,974,113 B2 | * | 7/2011 | Shimada et al. | 363/98 |

(Continued)

FOREIGN PATENT DOCUMENTS

| | | |
|---|---|---|
| JP | 2 114821 | 4/1990 |
| JP | 4 308474 | 10/1992 |

(Continued)

OTHER PUBLICATIONS

Combrink, F.W., et al., "Design Optimization of an Active Resonant Snubber for High Power IGBT Converters," IEE Transactions on Power Electronics, vol. 21, No. 1, pp. 114-123 (Jan. 2006).

(Continued)

*Primary Examiner* — Bao Q Vu
*Assistant Examiner* — Yusef Ahmed
(74) *Attorney, Agent, or Firm* — Oblon, Spivak, McClelland, Maier & Neustadt, L.L.P.

(57) ABSTRACT

A control circuit, during a positive period in which current flows from a power conversion apparatus to a load, causes a second snubber capacitor to discharge by controlling a second auxiliary switch to be turned on while a second main diode is turned on, and during a negative period in which current flows from the load to the power conversion apparatus, causes a first snubber capacitor to discharge by controlling a first auxiliary switch to be turned on while a first main diode is turned on.

4 Claims, 16 Drawing Sheets

(56) References Cited

U.S. PATENT DOCUMENTS

| | | | |
|---|---|---|---|
| 8,009,448 B2 * | 8/2011 | Liu | 363/56.12 |
| 8,207,717 B2 * | 6/2012 | Uruno et al. | 323/262 |
| 8,400,799 B2 * | 3/2013 | Fujiyoshi et al. | 363/98 |
| 2002/0054499 A1 * | 5/2002 | Tanaka et al. | 363/132 |
| 2011/0216557 A1 * | 9/2011 | Fujiyoshi et al. | 363/21.09 |
| 2012/0051103 A1 * | 3/2012 | Hosokawa et al. | 363/56.12 |

FOREIGN PATENT DOCUMENTS

| | | |
|---|---|---|
| JP | 5 502365 | 4/1993 |
| JP | 7 31158 | 1/1995 |
| JP | 10 4686 | 1/1998 |
| JP | 2003 219653 | 7/2003 |
| JP | 2004 187330 | 7/2004 |

OTHER PUBLICATIONS

Murai, Y., et al., "A Simple-Control New Soft-Switched PWM Inverter," IEEE, pp. 1307-1312, (Dec. 1998).

International Search Report Issued Jun. 29, 2010 in PCT/JP10/56758 Filed Apr. 15, 2010.

* cited by examiner

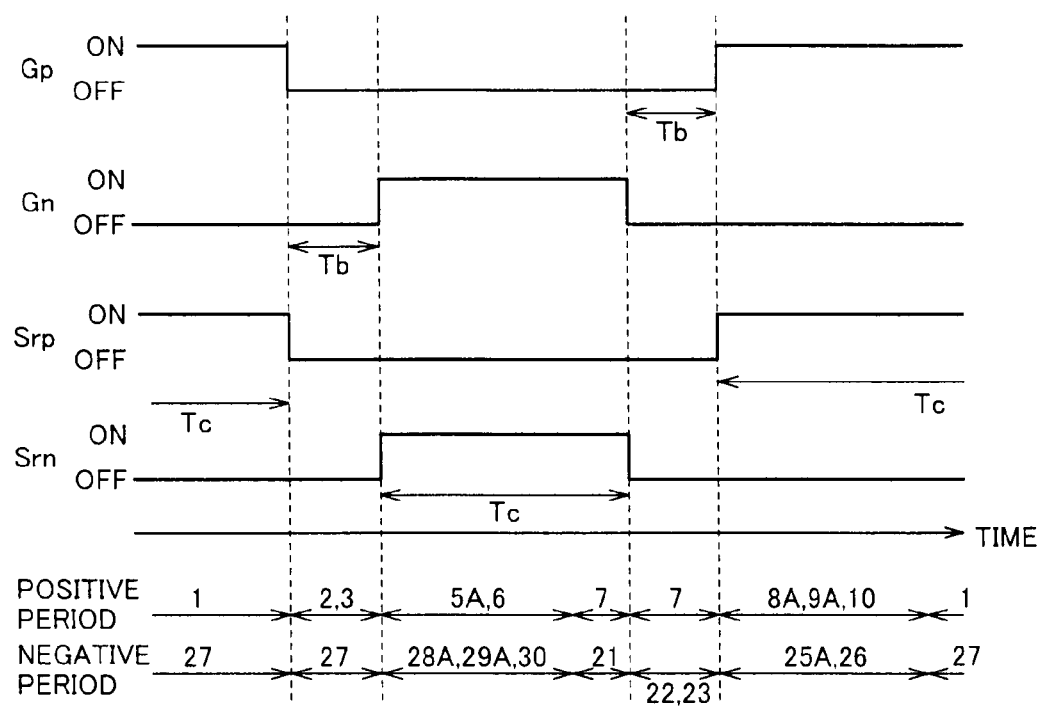

POWER CONVERSION APPARATUS

TECHNICAL FIELD

The present invention relates to a power conversion apparatus, and particularly to a power conversion apparatus that performs soft-switching.

BACKGROUND ART

Soft-switching inverters that perform soft-switching have been developed. Soft-switching includes zero-current switching wherein a switching device is turned on/off by causing current flowing through the switching device to be zero, and zero-voltage switching wherein a switching device is turned on/off by causing voltage applied to the switching device to be zero. With a soft-switching inverter, switching noise and switching loss can be reduced by this soft-switching.

Examples of soft-switching inverters are disclosed in Frederik W. Combrink et al., IEEE TRANSACTIONS ON POWER ELECTRONICS, VOL. 21, NO. 1, JANUARY 2006 (NPL 1) and Japanese National Patent Publication No. 5-502365 (PTL 1).

Citation List
Patent Literature
PTL 1: Japanese National Patent Publication No. 5-502365
Non Patent Literature
NPL 1: Frederik W. Combrink et al., IEEE TRANSACTIONS ON POWER ELECTRONICS, VOL. 21, NO. 1, JANUARY 2006

SUMMARY OF INVENTION

Technical Problem

With the soft-switching inverter described in NPL 1, however, switching loss is produced in main diodes Dn and Dp. For example, main diode Dn is now explained. In the sequence illustrated in FIG. 2 of NPL 1, a snubber capacitor Crn is charged to a power supply voltage level in a period from time 0 to time t1. Then, in a period from time t4 to time t5, a main switch Gn is controlled to be turned off, and main switch Gp is controlled to be turned on. This initiates commutation from main diode Dn to main switch Gp. Current flowing from a DC power supply Vp through main switch Gp is then increased to become equal to a load current, and simultaneously current flowing through main diode Dn reaches zero to turn off main diode Dn, thus completing this commutation.

Here, since snubber capacitor Crn has been charged to the power supply voltage level, at the moment when main diode Dn is turned off, the power supply voltage is applied to main diode Dn. Generally, switching loss produced when a diode is turned off is substantially proportional to the voltage applied to the diode immediately after the turn-off. For this reason, in the soft-switching inverter described in NPL 1, large switching loss is produced in main diode Dn. Moreover, PTL 1 discloses no configuration for solving this problem.

This invention was made in order to solve the above-described problem. An object of the invention is to provide a power conversion apparatus capable of reducing switching loss in main diodes connected in parallel with main switches.

Solution to Problem

A power conversion apparatus according to one aspect of this invention is a power conversion apparatus for converting DC power, supplied from a first DC power supply having a first electrode and a second electrode and from a second DC power supply having a first electrode connected to the second electrode of the above first DC power supply and a second electrode, into AC power, and supplying the AC power to a load, including: a first main switch having a first end coupled to the first electrode of the above first DC power supply and a second end coupled to the above load; a first main diode connected in parallel with the above first main switch, so as to have a direction of conduction reverse to that of the above first main switch; a first snubber capacitor connected in parallel with the above first main switch and the above first main diode; a first snubber diode connected in series with the above first snubber capacitor, so as to have a direction of conduction identical to that of the above first main switch, and connected between the above first snubber capacitor and the second end of the above first main switch; a first auxiliary switch and a first auxiliary reactor connected between a connection node of the above first DC power supply and the above second DC power supply and a connection node of the above first snubber capacitor and the above first snubber diode, and connected in series with each other; a second main switch having a first end coupled to the second end of the above first main switch and a second end coupled to the second electrode of the above second DC power supply, and provided so as to have a direction of conduction identical to that of the above first main switch; a second main diode connected in parallel with the above second main switch, so as to have a direction of conduction reverse to that of the above second main switch; a second snubber capacitor connected in parallel with the above second main switch and the above second main diode; a second snubber diode connected in series with the above second snubber capacitor, so as to have a direction of conduction identical to that of the above second main switch, and connected between the above second snubber capacitor and the first end of the above second main switch; a second auxiliary switch and a second auxiliary reactor connected between a connection node of the above first DC power supply and the above second DC power supply with the above first auxiliary switch or the above first auxiliary reactor and a connection node of the above second snubber capacitor and the above second snubber diode, and connected in series with each other; a protection circuit for causing, when voltage applied to the above first snubber capacitor has reached a predetermined value or higher, or when voltage applied to the above second snubber capacitor has reached a predetermined value or higher, charging current that is about to flow to the above first snubber capacitor or the above second snubber capacitor from the above first DC power supply and the above second DC power supply to flow to another current path; and a control circuit for controlling the above first main switch, the above second main switch, the above first auxiliary switch, and the above second auxiliary switch to be turned on and off. The above control circuit, during a positive period in which current flows from the above power conversion apparatus to the above load, causes the above second snubber capacitor to discharge by controlling the above second auxiliary switch to be turned on while the above second main diode is turned on, and during a negative period in which current flows from the above load to the above power conversion apparatus, causes the above first snubber capacitor to discharge by controlling the above first auxiliary switch to be turned on while the above first main diode is turned on.

Advantageous Effects of Invention

According to the present invention, switching loss in main diodes connected in parallel with main switches can be reduced.

BRIEF DESCRIPTION OF DRAWINGS

FIG. 16 is a diagram illustrating another example of a switch control procedure during power conversion by the soft-switching inverter according to the fifth embodiment of the present invention.

DESCRIPTION OF EMBODIMENTS

Figure 1:
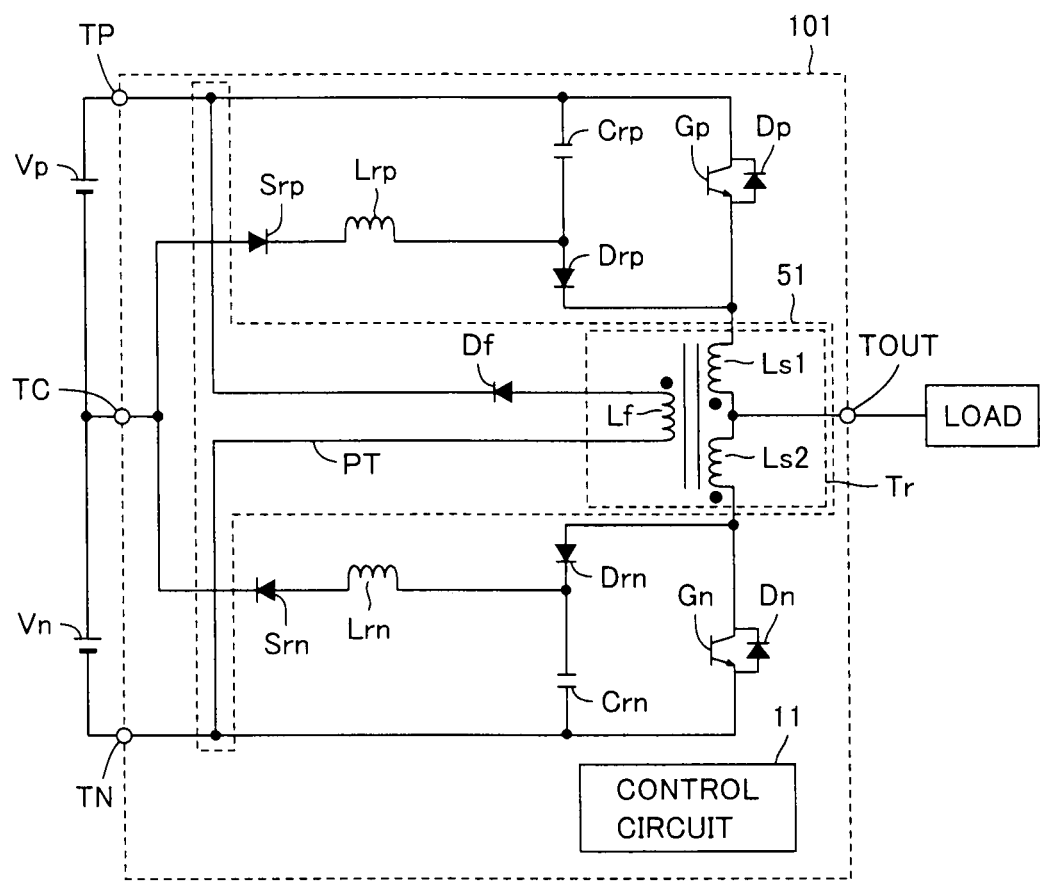
FIG. 1 is a diagram illustrating a configuration of a soft-switching inverter according to a first embodiment of the present invention.

An embodiment of the present invention will be described below with reference to the drawings, in which the same or corresponding parts have the same reference characters allotted, and the description thereof will not be repeated.

<First Embodiment>

FIG. 1 is a diagram illustrating a configuration of a soft-switching inverter according to a first embodiment of the present invention.

Referring to FIG. 1, a soft-switching inverter (power conversion apparatus) 101 includes: power supply terminals TP, TC, and TN; an AC output terminal TOUT; main switches Gp, Gn; main diodes Dp, Dn; snubber capacitors Crp, Crn; snubber diodes Drp, Drn; auxiliary switches Srp, Srn; auxiliary reactors Lrp, Lrn; a control circuit 11; and a protection circuit 51. Protection circuit 51 includes a transformer Tr and a clamp diode Df. Transformer Tr includes primary windings Ls1, Ls2 and a secondary winding Lf. It is noted that soft-switching inverter 101 may also be configured to include DC power supplies Vp, Vn.

Main switches Gp, Gn are, for example, IGBTs (Insulated Gate Bipolar Transistors). Auxiliary switches Srp, Srn are, for example, reverse blocking thyristors.

DC power supplies Vp, Vn are connected in series. That is, DC power supply Vp has a positive electrode connected to power supply terminal TP, and a negative electrode connected to power supply terminal TC. DC power supply Vn has a positive electrode connected to the negative electrode of DC power supply Vp and power supply terminal TC, and a negative electrode connected to power supply terminal TN.

Main switch Gp has a collector coupled to the positive electrode of DC power supply Vp, and an emitter coupled to a load via AC output terminal TOUT. That is, main switch Gp has the collector connected to power supply terminal TP, and the emitter connected to a first end of primary winding Ls1 of transformer Tr. Main diode Dp is connected in parallel with main switch Gp, so as to have a direction of conduction reverse to that of main switch Gp. That is, main diode Dp has a cathode connected to the collector of main switch Gp, and an anode connected to the emitter of main switch Gp. Snubber capacitor Crp is connected in parallel with main switch Gp and main diode Dp. Snubber diode Drp is connected in parallel with main switch Gp and main diode Dp, so as to have a direction of conduction identical to that of main switch Gp, and is connected in series with snubber capacitor Crp. That is, snubber diode Drp has an anode connected to a second end of snubber capacitor Crp and a second end of auxiliary reactor Lrp, and a cathode connected to the emitter of main switch Gp and the anode of main diode Dp. Auxiliary switch Srp and auxiliary reactor Lrp are connected between a connection node of DC power supply Vp and DC power supply Vn, i.e., power supply terminal TC, and a connection node of snubber capacitor Crp and snubber diode Drp, and are connected in series with each other. That is, auxiliary switch Srp has an anode connected to power supply terminal TC, and a cathode connected to a first end of auxiliary reactor Lrp. Auxiliary reactor Lrp has the first end connected to the cathode of auxiliary switch Srp, and a second end connected to the connection node of snubber capacitor Crp and snubber diode Drp.

Main switch Gn has a collector coupled to the emitter of main switch Gp, and an emitter coupled to the negative electrode of DC power supply Vn, and is provided so as to have a direction of conduction identical to that of main switch Gp. That is, main switch Gn has the collector connected to a second end of primary winding Ls2 of transformer Tr, and the emitter connected to power supply terminal TN. Main diode Dn is connected in parallel with main switch Gn, so as to have a direction of conduction reverse to that of main switch Gn. That is, main diode Dn has a cathode connected to the collector of main switch Gn, and an anode connected to the emitter of main switch Gn. Snubber capacitor Crn is connected in parallel with main switch Gn and main diode Dn. Snubber diode Drn is connected in parallel with main switch Gn and main diode Dn, so as to have a direction of conduction identical to that of main switch Gn, and is connected in series with snubber capacitor Crn. That is, snubber diode Drn has a cathode connected to a first end of snubber capacitor Crn and a second end of auxiliary reactor Lrn, and an anode connected to the collector of main switch Gn and the cathode of main diode Dn. Auxiliary switch Srn and auxiliary reactor Lrn are connected between a connection node of DC power supply Vp and DC power supply Vn with auxiliary switch Srp, i.e., power supply terminal TC, and a connection node of snubber capacitor Crn and snubber diode Drn, and are connected in series with each other. That is, auxiliary switch Srn has a cathode connected to power supply terminal TC, and an anode connected to a first end of auxiliary reactor Lrn. Auxiliary reactor Lrn has the first end connected to the anode of auxiliary switch Srn, and a second end connected to the connection node of snubber capacitor Crn and snubber diode Drn.

Protection circuit 51 is connected between the emitter of main switch Gp and the collector of main switch Gn. In protection circuit 51, primary windings Ls1, Ls2 are connected between the emitter of main switch Gp and the collector of main switch Gn. That is, primary winding Ls1 has a first end connected to the emitter of main switch Gp and the cathode of snubber diode Drp, and a second end connected to AC output terminal TOUT and a first end of primary winding Ls2. Primary winding Ls2 has the first end connected to AC output terminal TOUT and the second end of primary winding Ls1, and the second end connected to the collector of main switch Gn and the anode of snubber diode Drn. Primary windings Ls1, Ls2 have the same winding direction.

Secondary winding Lf is connected between the positive electrode of DC power supply Vp and the negative electrode of DC power supply Vn, and is magnetically coupled to primary windings Ls1, Ls2. That is, secondary winding Lf has a first end connected to an anode of clamp diode Df and a second end connected to power supply terminal TN. Secondary winding Lf has a winding direction reverse to that of primary windings Ls1, Ls2. Further, transformer Tr has a turns ratio between primary winding and secondary winding of 1:n, where n>2, for example.

Clamp diode Df is connected between the positive electrode of DC power supply Vp and the negative electrode of DC power supply Vn, and is connected in series with secondary winding Lf. That is, clamp diode Df has a cathode connected to power supply terminal TP, and an anode connected to the first end of secondary winding Lf.

Soft-switching inverter 101 converts DC power supplied from DC power supply Vp and DC power supply Vn into AC power by switching the DC power supplied from DC power supplies Vp, Vn with main switches Gp, Gn, which are main arms, and supplies the AC power to the load via AC output terminal TOUT.

Snubber capacitor Crp is provided so as to prevent voltage from being applied to main switch Gp when main switch Gp is turned off. Snubber capacitor Crn is provided in order to prevent voltage from being applied to main switch Gn when main switch Gn is turned off.

Figure 2:
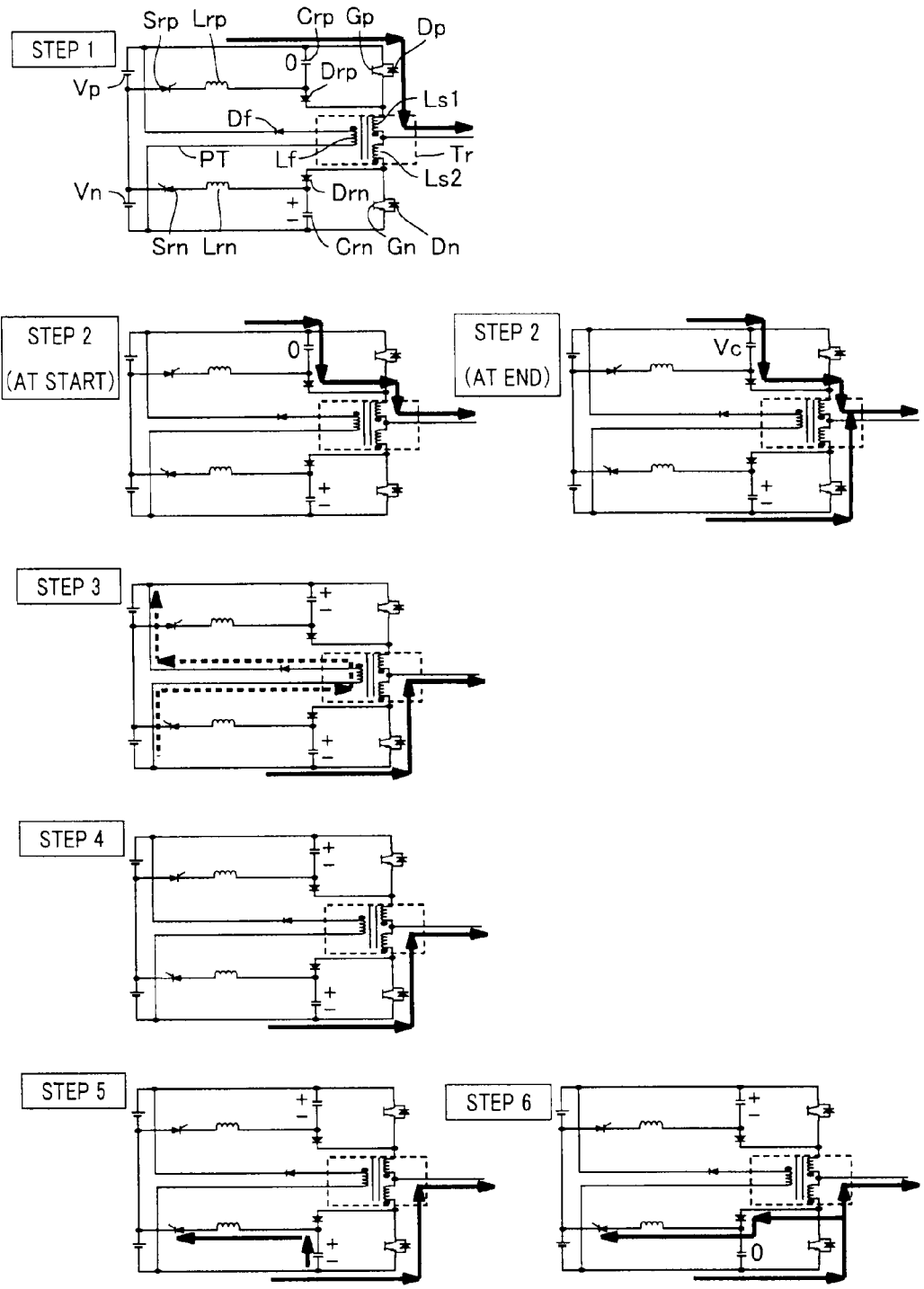
FIG. 2 is a diagram illustrating current flow in time sequence during power conversion by the soft-switching inverter according to the first embodiment of the present invention.

An anode reactor Lbp in the soft-switching inverter illustrated in FIG. 2 of NPL 1 is provided so as to prevent current from flowing through main switch Gp when main switch Gp is turned on. An anode reactor Lbn is also provided so as to prevent current from flowing through main switch Gn when main switch Gn is turned on. In contrast, although anode reactors Lbp and Lbn are not provided in soft-switching inverter 101, primary windings Ls1 and Ls2 of transformer Tr also serve as anode reactors Lbp and Lbn.

Control circuit 11 performs switching control of main switches Gp, Gn and auxiliary switches Srp, Srn.

Protection circuit 51 has a current path PT between the positive electrode of DC power supply Vp and the negative electrode of DC power supply Vn. By using transformer Tr, protection circuit 51 suppresses a maximum voltage applied to main switches Gp and Gn to a maximum value VM, which is lower than twice an output voltage of DC power supplies Vp and Vn.

Next, operations of the soft-switching inverter according to the first embodiment of the present invention during power conversion will be described referring to the drawings. Operations during a positive period in which current flows from soft-switching inverter 101 to the load will be first described, and then operations during a negative period in which current flows from the load to soft-switching inverter 101 will be described.

[Operations During Positive Period]

Figure 3:
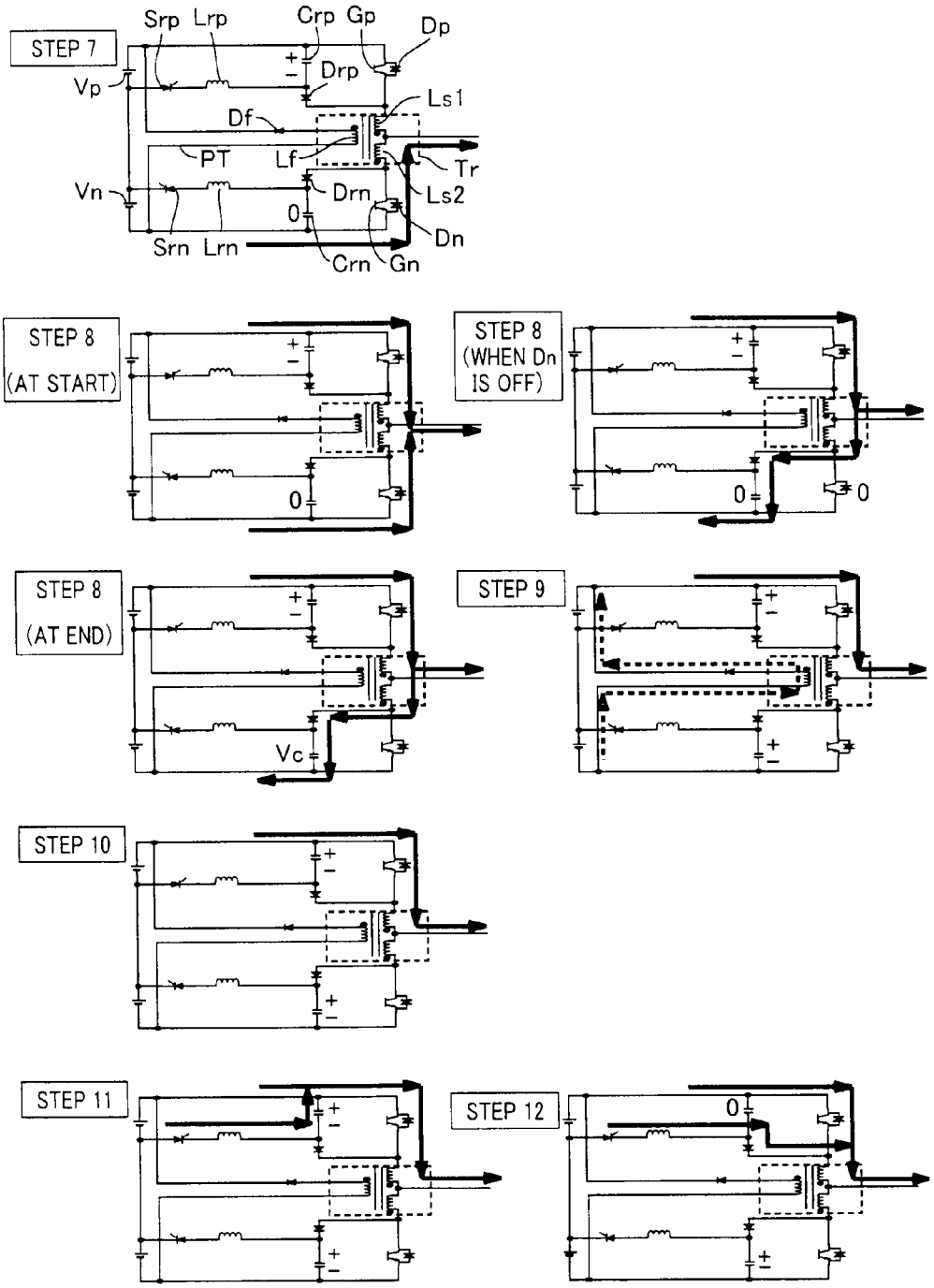
FIG. 3 is a diagram illustrating current flow in time sequence during power conversion by the soft-switching inverter according to the first embodiment of the present invention.
Figure 4:
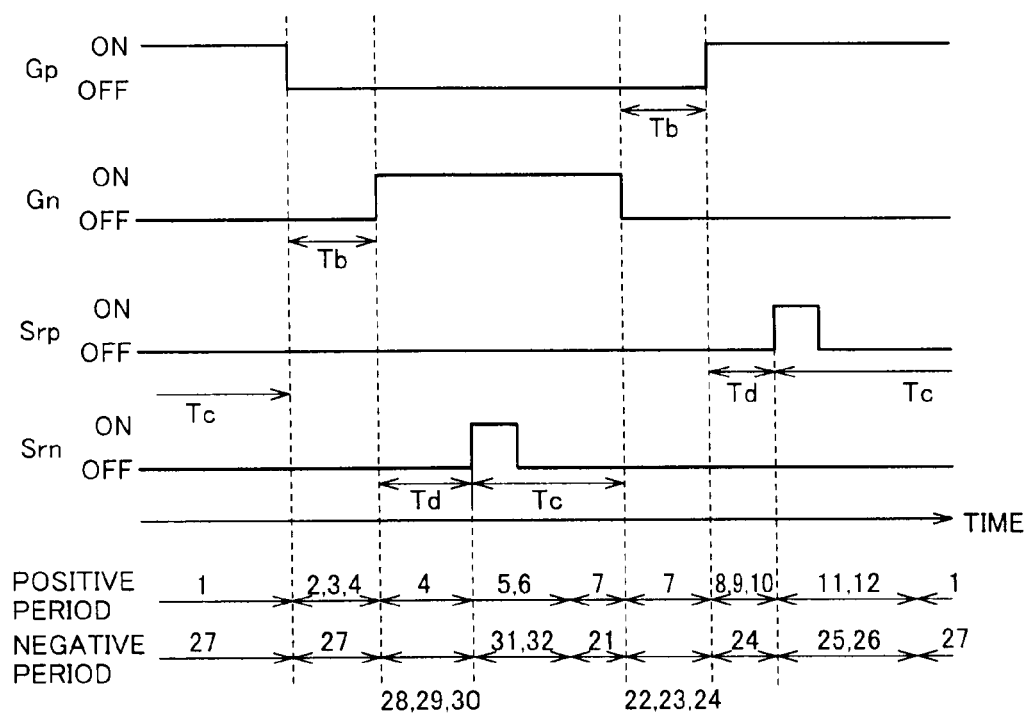
FIG. 4 is a diagram illustrating a switch control procedure during power conversion by the soft-switching inverter according to the first embodiment of the present invention.

FIGS. 2 and 3 are diagrams each illustrating current flow in time sequence during power conversion by the soft-switching inverter according to the first embodiment of the present invention. FIG. 4 is a diagram illustrating a switch control procedure during power conversion by the soft-switching inverter according to the first embodiment of the present invention. Here, an output voltage of DC power supply Vp is defined as Vp, and an output voltage of DC power supply Vn is defined as Vn.

In FIGS. 2 and 3, "+, −" placed next to each of snubber capacitors Crp and Crn represents a state wherein electric charges are stored in the snubber capacitor and the polarities of the electric charges; and "0" represents a state wherein the electric charges of the snubber capacitor are zero.

The horizontal axis in FIG. 4 represents time, and each of the numbers for the "positive period" aligned along this horizontal axis represents each of the steps shown in FIGS. 2 and 3.

Referring to FIGS. 2 to 4, a state (a step 1) wherein main switch Gp is controlled to be turned on, main switch Gn is controlled to be turned off, auxiliary switches Srp and Srn are controlled to be turned off, and current is flowing from DC power supply Vp to the load through main switch Gp will be first described.

In this state, main switch Gp is controlled to be turned off. This causes commutation of the current from DC power supply Vp to snubber capacitor Crp. Snubber capacitor Crp is thereby charged, and when voltage across snubber capacitor Crp has become equal to an output voltage (Vp+Vn) of DC power supplies Vp and Vn, main diode Dn becomes conducting. Once main diode Dn becomes conducting, current from DC power supply Vn flows to the load through main diode Dn (a step 2).

Here, at the time of start of step 2, when main switch Gp is controlled to be turned off, current flows to snubber capacitor Crp. Since the electric charges in snubber capacitor Crp are zero when main switch Gp is turned off, no voltage is applied to main switch Gp. In this way, zero-voltage switching is realized.

Next, owing to resonance of snubber capacitor Crp with excitation inductance of primary windings Ls1 and Ls2, current flowing to snubber diode Drp from snubber capacitor Crp begins to decrease.

Further, snubber capacitor Crp is charged by resonant current between snubber capacitor Crp and excitation inductance of primary windings Ls1 and Ls2 of transformer Tr. At this time, the voltage corresponding to a difference between the output voltage (Vp+Vn) of DC power supplies Vp and Vn and voltage Vc across snubber capacitor Crp is applied to the series circuit of primary winding Ls1 and Ls2 of transformer Tr. A voltage half the above-mentioned differential voltage is applied to each of primary windings Ls1 and Ls2. That is, a value VL of the voltage applied to each of primary windings Ls1 and Ls2 is expressed by the following equation:

$$VL=\{(Vp+Vn)-Vc\}/2$$

Since transformer Tr has a turns ratio of 1:n, a voltage of n×VL is induced to a secondary side. When voltage Vc across snubber capacitor Crp rises and voltage on the secondary side of transformer Tr reaches the output voltage (Vp+Vn), clamp diode Df is turned on and snubber diode Drp is turned off. At this time, maximum value VM of voltage Vc is expressed by the following equation:

$$VM=(1+2/n)\times(Vp+Vn)$$

Then, current flows as shown by the dashed line shown in a step 3 in FIG. 2, and hence current flowing to snubber capacitor Crp reaches zero and snubber capacitor Crp is no longer charged. Thus, voltage Vc across snubber capacitor Crp is clamped to VM. After the current flowing through clamp diode Df decreases to reach zero in time, clamp diode Df is turned off, thus ending the commutation through current path PT (step 3).

Next, after a predetermined time period Tb has elapsed since controlling main switch Gp to be turned off, main switch Gn is controlled to be turned on. However, since the current from main diode Dn to the load has a current polarity reverse to a direction of conduction of main switch Gn, main switch Gn does not become conducting, and current continues to flow to the load through main diode Dn (a step 4). That is, current does not flow through main switch Gn when main switch Gn is controlled to be turned on. In this way, zero-current switching is realized.

Next, after a predetermined time period Td has elapsed since controlling main switch Gn to be turned on, auxiliary switch Srn is controlled to be turned on. Thus, snubber capacitor Crn begins to discharge. When the discharge is completed and voltage across snubber capacitor Crn reaches zero, snubber diode Drn becomes conducting (a step 5).

Next, once snubber diode Drn becomes conducting, voltage from DC power supply Vn is applied to auxiliary reactor Lrn. Thus, the current flowing through auxiliary switch Srn begins to attenuate, and when it reaches zero, auxiliary switch Srn and snubber diode Drn are both turned off (a step 6).

Next, after a predetermined time period Tc has elapsed since controlling auxiliary switch Srn to be turned on, main switch Gn is controlled to be turned off. That is, with main diode Dn being continuously conducting and the current from DC power supply Vn flowing to the load through main diode Dn, main switch Gn is controlled to be turned off (a step 7). At this time, there is no change in state because main switch Gn is not conducting although it is controlled to be turned on.

Next, after predetermined time period Tb has elapsed since controlling main switch Gn to be turned off, main switch Gp is controlled to be turned on. This causes commutation from main diode Dn to main switch Gp. Current flowing from DC power supply Vp through main switch Gp is then increased to become equal to the load current, and simultaneously current flowing through main diode Dn reaches zero to turn off main diode Dn, thus completing this commutation.

Here, at the moment when main diode Dn is turned off, snubber diode Drn becomes conducting. At this time, since the electric charges in snubber capacitor Crn are zero, the current flowing from DC power supply Vp through main switch Gp flows to snubber capacitor Crn. That is, since no voltage is applied to main diode Dn, no switching loss is produced in main diode Dn. In this way, zero-voltage switching is realized (a step 8).

Next, owing to resonance of snubber capacitor Crn with excitation inductance of primary windings Ls1 and Ls2, current flowing to snubber diode Drn from snubber capacitor Crn begins to decrease.

Further, snubber capacitor Crn is charged by resonant current between snubber capacitor Crn and excitation inductance of primary windings Ls1 and Ls2 of transformer Tr. At this time, the voltage corresponding to a difference between the output voltage (Vp+Vn) of DC power supplies Vp and Vn and voltage Vc across snubber capacitor Crn is applied to the series circuit of primary winding Ls1 and Ls2 of transformer Tr. A voltage half the above-mentioned differential voltage is applied to each of primary windings Ls1 and Ls2. That is, value VL of the voltage applied to each of primary windings Ls1 and Ls2 is expressed by the following equation:

$$VL=\{(Vp+Vn)-Vc\}/2$$

Since transformer Tr has a turns ratio of 1:n, a voltage of n×VL is induced to the secondary side. When voltage Vc across snubber capacitor Crn rises and the voltage on the secondary side of transformer Tr reaches the output voltage (Vp+Vn), clamp diode Df is turned on and snubber diode Drn is turned off. At this time, maximum value VM of voltage Vc is expressed by the following equation:

$$VM=(1+2/n)\times(Vp+Vn)$$

Then, current flows as shown by the dashed line shown in a step 9 in FIG. 3, and hence current flowing to snubber capacitor Crn reaches zero and snubber capacitor Crn is no longer charged. Thus, voltage Vc across snubber capacitor Crn is clamped to VM. Then, when current flowing through clamp diode Df decreases to reach zero in time, clamp diode Df is turned off, thus ending the commutation through current path PT (step 9).

Next, current from DC power supply Vp is flowing through main switch Gp to the load (a step 10).

Next, after predetermined time period Td has elapsed since controlling main switch Gp to be turned on, auxiliary switch Srp is controlled to be turned on. Thus, snubber capacitor Crp begins to discharge. When the discharge is completed and the voltage across snubber capacitor Crp reaches zero, snubber diode Drp becomes conducting (a step 11).

Next, once snubber diode Drp becomes conducting, voltage from DC power supply Vp is applied to auxiliary reactor Lrp. Therefore, the current flowing through auxiliary switch Srp begins to attenuate, and when it reaches zero, auxiliary switch Srp and snubber diode Drp are both turned off, and the operation returns to the state in step 1 (a step 12).

In the soft-switching inverter according to the first embodiment of the present invention, when voltage Vc across the snubber capacitor reaches voltage value VM, while snubber capacitor Crp or Crn is about to become overcharged by resonance to a voltage higher than a power supply voltage Vs, energy that is about to cause current to flow through primary windings Ls1 and Ls2 of transformer Tr is transferred to secondary winding Lf of transformer Tr, thus preventing charging current from flowing through the snubber capacitor. Therefore, charging of the snubber capacitor ceases, and the maximum voltage of the snubber capacitor is clamped to VM. Here, the turns ratio n of transformer Tr is set to n>2, thereby setting VM to not more than twice Vs. Moreover, when n is increased, VM≈(Vp+Vn), and therefore, voltage Vc across the snubber capacitor can be suppressed to a value as close as possible to power supply voltage Vs.

[Operation During Negative Period]

Figure 5:
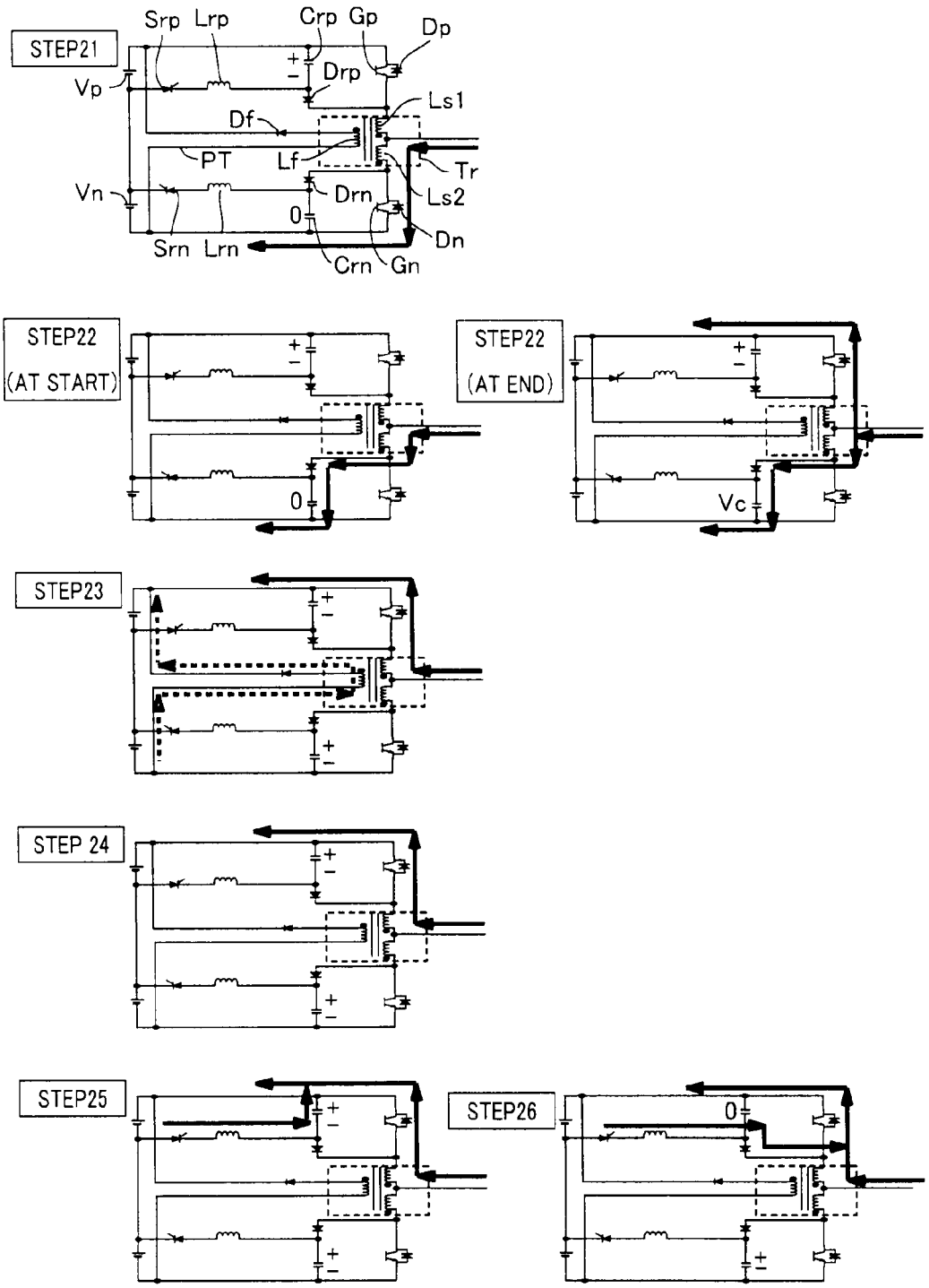
FIG. 5 is a diagram illustrating current flow in time sequence during power conversion by the soft-switching inverter according to the first embodiment of the present invention.
Figure 6:
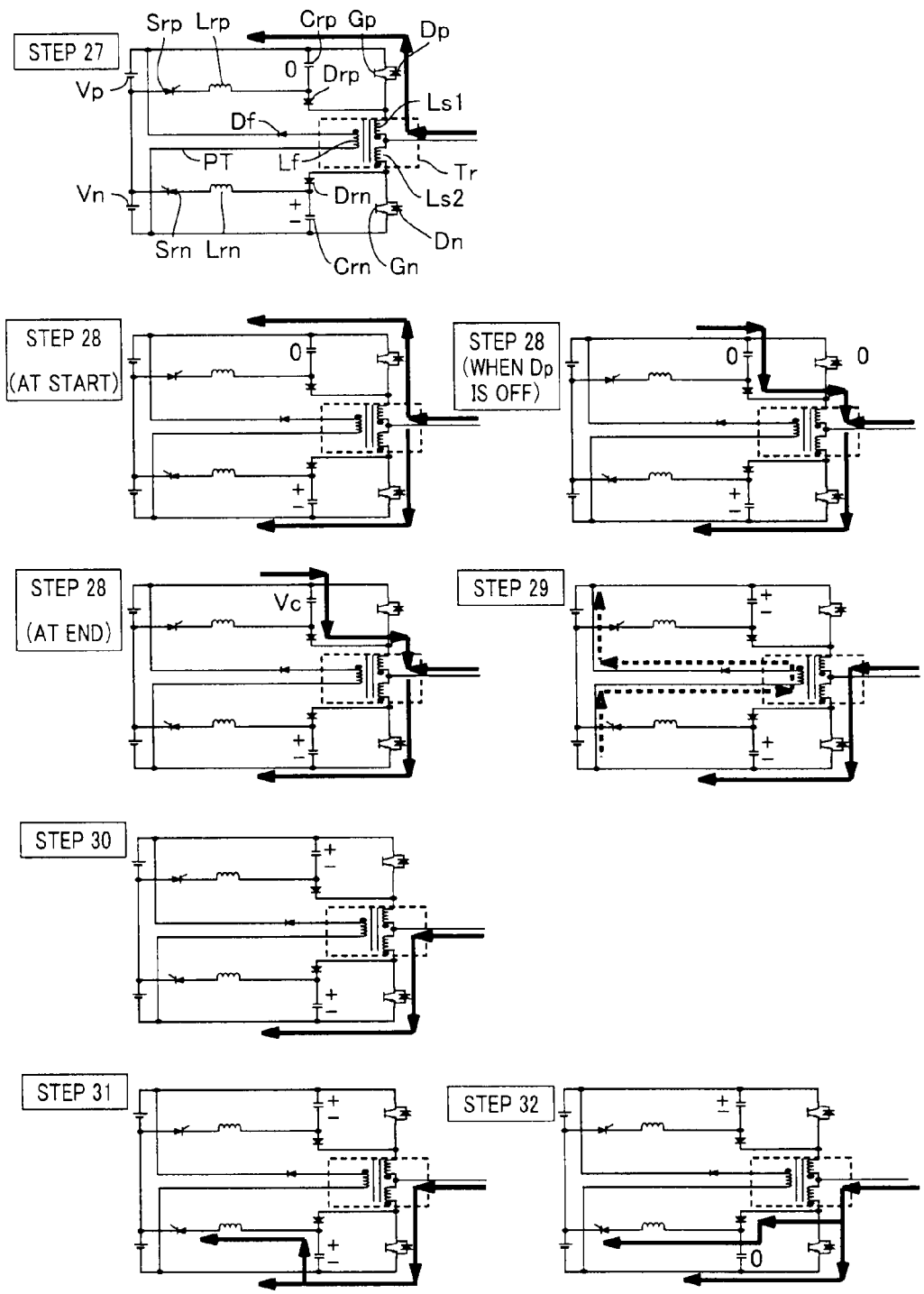
FIG. 6 is a diagram illustrating current flow in time sequence during power conversion by the soft-switching inverter according to the first embodiment of the present invention.

FIGS. 5 and 6 are diagrams each illustrating current flow in time sequence during power conversion by the soft-switching inverter according to the first embodiment of the present invention. Here, the output voltage of DC power supply Vp is defined as Vp, and the output voltage of DC power supply Vn is defined as Vn.

In FIGS. 5 and 6, "+, −" placed next to each of snubber capacitors Crp and Crn represents a state wherein electric charges are stored in the snubber capacitor and the polarities of the electric charges; and "0" represents a state wherein the electric charges of the snubber capacitor are zero.

The horizontal axis in FIG. 4 represents time, and each of the numbers for the "negative period" aligned along this horizontal axis represents each of the steps shown in FIGS. 5 and 6.

Referring to FIGS. 4 to 6, a state (a step 21) wherein main switch Gn is controlled to be turned on, main switch Gp is controlled to be turned off, auxiliary switches Srn and Srp are controlled to be turned off, and current is flowing from DC power supply Vn to the load through main switch Gn will be first described.

In this state, main switch Gn is controlled to be turned off. This causes commutation of the current from the load to snubber capacitor Crn. Snubber capacitor Crn is thus charged, and when the voltage across snubber capacitor Crn has become equal to the output voltage (Vn+Vp) of DC power supplies Vn and Vp, main diode Dp becomes conducting. Once main diode Dp becomes conducting, current from the load flows to DC power supply Vp through main diode Dp (a step 22).

Here, at the time of start of step 22, when main switch Gn is controlled to be turned off, current flows to snubber capacitor Crn. Then, since the electric charges in snubber capacitor Crn are zero when main switch Gn is turned off, no voltage is applied to main switch Gn. In this way, zero-voltage switching is realized.

Next, owing to the resonance of snubber capacitor Crn with excitation inductance of primary windings Ls1 and Ls2, current flowing to snubber capacitor Crn from snubber diode Drn begins to decrease.

Further, snubber capacitor Crn is charged by the resonant current between snubber capacitor Crn and excitation inductance of primary windings Ls1 and Ls2 of transformer Tr. At this time, the voltage corresponding to a difference between the output voltage (Vn+Vp) of DC power supplies Vn and Vp and voltage Vc across snubber capacitor Crn is applied to the series circuit of primary winding Ls1 and Ls2 of transformer Tr. A voltage half the above-mentioned differential voltage is applied to each of primary windings Ls1 and Ls2. That is, value VL of the voltage applied to each of primary windings Ls1 and Ls2 is expressed by the following equation:

$$VL=\{(Vn+Vp)-Vc\}/2$$

Since transformer Tr has a turns ratio of 1:n, a voltage of n×VL is induced to the secondary side. When voltage Vc across snubber capacitor Crn rises and the voltage on the secondary side of transformer Tr reaches the output voltage (Vn+Vp), clamp diode Df is turned on and snubber diode Drn is turned off. At this time, maximum value VM of voltage Vc is expressed by the following equation:

$$VM=(1+2/n)\times(Vn+Vp)$$

Then, current flows as shown by the dashed line shown in a step 23 in FIG. 5, and hence current flowing to snubber capacitor Crn reaches zero and snubber capacitor Crn is no longer charged. Thus, voltage Vc across snubber capacitor Crn is clamped to VM. Then, when the current flowing through clamp diode Df decreases to reach zero in time, clamp diode Df is turned off, thus ending the commutation through current path PT (step 23).

Next, after predetermined time period Tb has elapsed since controlling main switch Gn to be turned off, main switch Gp is controlled to be turned on. However, since the current from the load to main diode Dp has a current polarity reverse to a direction of conduction of main switch Gp, main switch Gp does not become conducting, and current continues to flow to DC power supply Vp through main diode Dp (a step 24). That is, current does not flow through main switch Gp when main switch Gp is controlled to be turned on. In this way, zero-current switching is realized.

Next, after predetermined time period Td has elapsed since controlling main switch Gp to be turned on, auxiliary switch Srp is controlled to be turned on. Thus, snubber capacitor Crp begins to discharge. When the discharge is completed and the voltage across snubber capacitor Crp reaches zero, snubber diode Drp becomes conducting (a step 25).

Next, once snubber diode Drp becomes conducting, voltage from DC power supply Vp is applied to auxiliary reactor Lrp. Therefore, the current flowing through auxiliary switch Srp begins to attenuate, and when it reaches zero, auxiliary switch Srp and snubber diode Drp are both turned off (a step 26).

Next, after a predetermined time period Tc has elapsed since controlling auxiliary switch Srp to be turned on, main switch Gp is controlled to be turned off. That is, with main diode Dp being continuously conducting and the current from the load flowing to DC power supply Vp through main diode Dp, main switch Gp is controlled to be turned off (a step 27). At this time, there is no change in state because main switch Gp is not conducting although it is controlled to be turned on.

Next, after predetermined time period Tb has elapsed since controlling main switch Gp to be turned off, main switch Gn is controlled to be turned on. This causes commutation from main diode Dp to main switch Gn. Current flowing from DC power supply Vn through main switch Gn is then increased to become equal to the load current, and simultaneously current flowing through main diode Dp reaches zero to turn off main diode Dp, thus completing this commutation.

Here, at the moment when main diode Dp is turned off, snubber diode Drp becomes conducting. At this time, since the electric charges in snubber capacitor Crp are zero, the current from DC power supply Vp flows to snubber capacitor Crp. That is, since no voltage is applied to main diode Dp, no switching loss is produced in main diode Dp. In this way, zero-voltage switching is realized (a step 28).

Next, owing to the resonance of snubber capacitor Crp with excitation inductance of primary windings Ls1 and Ls2, current flowing to snubber diode Drp from snubber capacitor Crp begins to decrease.

Further, snubber capacitor Crp is charged by the resonant current between snubber capacitor Crp and excitation inductance of primary windings Ls1 and Ls2 of transformer Tr. At this time, the voltage corresponding to a difference between the output voltage (Vn+Vp) of DC power supplies Vn and Vp and voltage Vc across snubber capacitor Crp is applied to the series circuit of primary winding Ls1 and Ls2 of transformer Tr. A voltage half the above-mentioned differential voltage is applied to each of primary windings Ls1 and Ls2. That is, value VL of the voltage applied to each of primary windings Ls1 and Ls2 is expressed by the following equation:

$$VL=\{(Vn+Vp)-Vc\}/2$$

Since transformer Tr has a turns ratio of 1:n, a voltage of n×VL is induced to the secondary side. When voltage Vc across snubber capacitor Crp rises and the voltage on the secondary side of transformer Tr reaches the output voltage (Vn+Vp), clamp diode Df is turned on and snubber diode Drp is turned off. At this time, maximum value VM of voltage Vc is expressed by the following equation:

$$VM=(1+2/n)\times(Vn+Vp)$$

Then, current flows as shown by the dashed line shown in a step 29 in FIG. 6, and hence current flowing to snubber capacitor Crp reaches zero and snubber capacitor Crp is no longer charged. Thus, voltage Vc across snubber capacitor Crp is clamped to VM. Then, when the current flowing through clamp diode Df decreases to reach zero in time, clamp diode Df is turned off, thus ending the commutation through current path PT (step 29).

Next, current from the load flows through main switch Gn to DC power supply Vn (a step 30).

Next, after predetermined time period Td has elapsed since controlling main switch Gn to be turned on, auxiliary switch Srn is controlled to be turned on. Thus, snubber capacitor Crn begins to discharge. When the discharge is completed and the voltage across snubber capacitor Crn reaches zero, snubber diode Dm becomes conducting (a step 31).

Next, once snubber diode Drn becomes conducting, voltage from DC power supply Vn is applied to auxiliary reactor Lrn. Therefore, the current flowing through auxiliary switch Srn begins to attenuate, and when it reaches zero, auxiliary switch Srn and snubber diode Drn are both turned off, and the operation returns to the state in step 21 (a step 32).

In the soft-switching inverter according to the first embodiment of the present invention, when voltage Vc across the snubber capacitor reaches voltage value VM, while snubber capacitor Crn or Crp is about to become overcharged by resonance to a voltage higher than power supply voltage Vs, energy that is about to cause current to flow through primary windings Ls1 and Ls2 of transformer Tr is transferred to secondary winding Lf of transformer Tr, thus preventing charging current from flowing through the snubber capacitor. Therefore, charging of the snubber capacitor ceases, and the maximum voltage of the snubber capacitor is clamped to VM. Here, the turns ratio n of transformer Tr is set to n>2, thereby setting VM to not more than twice Vs. Moreover, when n is increased, VM≈(Vn+Vp), and therefore, voltage Vc across the snubber capacitor can be suppressed to a value as close as possible to power supply voltage Vs.

Soft-switching inverter 101 repeatedly performs the operations at steps 1 through 12 shown in FIGS. 2 and 3 as operations during the positive period, and repeatedly performs the operations at steps 21 through 32 shown in FIGS. 5 and 6 as operations during the negative period. Soft-switching inverter 101 supplies AC power to the load by performing the operations during the positive period and the operations during the negative period alternately.

Here, the soft-switching inverter described in NPL 1 had a problem in that switching loss is produced in the main diodes connected in parallel with the main switches.

In the soft-switching inverter according to the first embodiment of the present invention, however, control circuit 11, during the positive period, causes snubber capacitor Crn to discharge by controlling auxiliary switch Srn to be turned on while main diode Dn is turned on, and during the negative period, causes snubber capacitor Crp to discharge by controlling auxiliary switch Srp to be turned on while main diode Dp is turned on.

With this configuration, the voltage applied when the main diode connected in parallel with the main switch is turned off can be reduced to zero, thus achieving reduced switching loss in the main diode.

Further, in the soft-switching inverter according to the first embodiment of the present invention, control circuit 11 controls main switch Gn to be turned on after a predetermined time period has elapsed since controlling main switch Gp to be turned off, controls auxiliary switch Srn to be turned on after a predetermined time period has elapsed since controlling main switch Gn to be turned on, controls main switch Gn to be turned off after a predetermined time period has elapsed since controlling auxiliary switch Srn to be turned on, controls main switch Gp to be turned on after a predetermined time period has elapsed since controlling main switch Gn to be turned off, controls auxiliary switch Srp to be turned on after a predetermined time period has elapsed since controlling main switch Gp to be turned on, and controls main switch Gp to be turned off after a predetermined time period has elapsed since controlling auxiliary switch Srp to be turned on.

By performing this switch control, it is possible to perform the same switch control during both the positive and negative periods. That is, since the switch control procedure can be the same regardless of the polarity of the load current, it is not necessary to change the switch control procedure by distinguishing the polarity of the load current, thereby achieving simplified control.

Furthermore, the soft-switching inverter described in NPL 1 is based on the premise that the load current is somewhat large. For example, in the sequence shown in FIG. 2 of NPL 1, when the load current is very small, charging of snubber capacitor Crp is extremely slow during the period from time 0 to time t1, and thus, the time until transfer to operations during a period from time t1 to time t3 is lengthened. That is, the commutation time to main diode Dn is very long.

Possible measures to avoid this phenomenon are to turn on main switch Gn after a predetermined time period has elapsed since time 0, i.e., the time when main switch Gp is turned off When main switch Gn is turned on while snubber capacitor Crp is being charged during the period from time 0 to time t1, snubber capacitor Crp is charged by resonance of snubber capacitor Crp with anode reactors Lbp and Lbn. Then, when the voltage of snubber capacitor Crp reaches a power supply voltage, current flowing through main switch Gn begins to decrease. When the current flowing through main switch Gn then reaches zero, main switch Gn is turned off and main diode Dn becomes conducting, and the operation is thereby transferred to an operation during a period from time t2 to time t3.

When snubber capacitor Crp is charged by utilizing the resonance as described above, however, snubber capacitor Crp is overcharged to a voltage higher than the power supply voltage. When the load current is as close as possible to zero, snubber capacitor Crp is charged by the above-described resonance up to a maximum of twice the power supply voltage. Since the charging voltage of snubber capacitor Crp is applied to main switch Gn and main diode Dn, a breakdown voltage of at least twice the power supply voltage is required of these devices. Thus, there was the problem of increase in the size of the soft-switching inverter, and also in the cost.

In the soft-switching inverter according to the first embodiment of the present invention, however, when the voltage applied to snubber capacitor Crp or the voltage applied to snubber capacitor Crn has reached a predetermined value or higher, protection circuit 51 causes the charging current that is about to flow to snubber capacitor Crp or snubber capacitor Crn from DC power supply Vp and DC power supply Vn to flow between the positive electrode of DC power supply Vp and the negative electrode of DC power supply Vn via current path PT.

More specifically, protection circuit 51 receives the voltage corresponding to a difference between the output voltage of DC power supply Vp and DC power supply Vn and the voltage applied to snubber capacitor Crp, or the voltage corresponding to a difference between the output voltage of DC power supply Vp and DC power supply Vn and the voltage applied to snubber capacitor Crn, generates a voltage by boosting the received voltage, and based on the generated voltage, switches whether or not to cause the charging current to flow between the positive electrode of DC power supply Vp and the negative electrode of DC power supply Vn via current path PT.

That is, the transformer is inserted into the soft-switching inverter according to the first embodiment of the present invention, and the turns ratio of the transformer is set to 1:n (n>2), thereby suppressing a maximum charge voltage of the snubber capacitor to not more than twice the power supply voltage. That is, when the voltage applied to the snubber capacitor reaches a predetermined voltage, while the snubber capacitor is about to become overcharged by resonance to a voltage higher than the power supply voltage, protection circuit 51 transfers the energy that is about to cause current to flow to the primary winding of the transformer, to the secondary winding of the transformer. Charging is thus stopped by preventing the charging current from flowing through the snubber capacitor, thus clamping the voltage applied to the snubber capacitor. Further, the turns ratio n of transformer Tr is set to n>2, thereby setting the clamp voltage to not more than twice the power supply voltage. Moreover, when n is increased, the voltage applied to the snubber capacitor can be suppressed to a value as close as possible to the power supply voltage.

Hence, since the voltage applied to the main switches and main diodes is also limited, the breakdown voltage of these devices can be lowered, thus achieving reduction in the apparatus size and cost. In contrast, by using devices having the same breakdown voltage without changing the breakdown voltage of these devices, it is possible to achieve an output voltage higher than heretofore obtained. That is, by suppressing the charging voltage of the snubber capacitor, the voltage utilization ratio of the main switches and main diodes is improved, thus achieving a higher output voltage using the devices having the same breakdown voltage.

It is noted that the protection circuit is not limited to the configuration shown in FIG. 1, and may be configured such that, when the voltage applied to snubber capacitor Crp has reached a predetermined value or higher, or when the voltage applied to snubber capacitor Crn has reached a predetermined value or higher, the protection circuit causes the charging current that is about to flow to snubber capacitor Crp or snubber capacitor Crn from DC power supply Vp and DC power supply Vn to escape to another current path.

Figure 7:
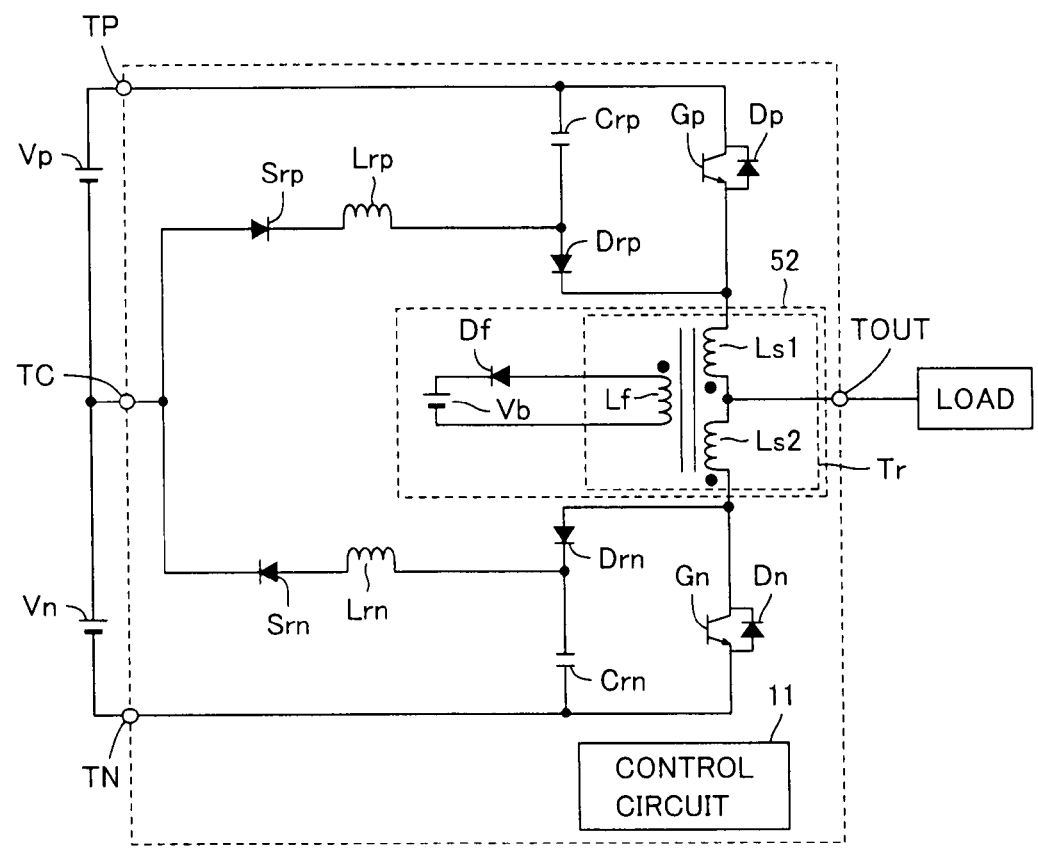
FIG. 7 is a diagram illustrating a configuration of a modification of the soft-switching inverter according to the first embodiment of the present invention.

FIG. 7 is a diagram illustrating a configuration of a modification of the soft-switching inverter according to the first embodiment of the present invention.

Referring to FIG. 7, this soft-switching inverter includes a protection circuit 52 instead of protection circuit 51, as compared with soft-switching inverter 101. Protection circuit 52 includes transformer Tr, clamp diode Df, and a DC power supply Vb. DC power supply Vb has a positive electrode connected to a cathode of clamp diode Df, and a negative electrode connected to an anode of clamp diode Df.

Although in the soft-switching inverter according to the first embodiment of the present invention, the cathode of clamp diode Df is connected to the positive electrode of DC power supply Vp, the present invention is not limited to this configuration. That is, as shown in FIG. 7, protection circuit 52 may include DC power supply Vb separate from DC power supplies Vp and Vn.

When the voltage applied to snubber capacitor Crp has reached a predetermined value or higher, or when the voltage applied to snubber capacitor Crn has reached a predetermined value or higher, protection circuit 52 causes the charging current that is about to flow to snubber capacitor Crp or snubber capacitor Crn from DC power supply Vp and DC power supply Vn to flow to DC power supply Vb by way of clamp diode Df.

With this configuration, even though the voltage corresponding to a difference between the output voltage of DC power supplies Vp and Vn and voltage Vc across the snubber capacitor is not boosted by transformer Tr, clamp diode Df can be turned on before the voltage applied to the snubber capacitor becomes, for example, twice the output voltage of DC power supplies Vp and Vn, thus making it possible to limit the voltage applied to the snubber capacitor to not more than twice the output voltage of DC power supplies Vp and Vn.

Another embodiment of the present invention will be described next with reference to the drawings, in which the same or corresponding parts have the same reference characters allotted, and the description thereof will not be repeated.

<Second Embodiment>

The present embodiment relates to a soft-switching inverter including a circuit alternative to the transformer, as compared with the soft-switching inverter according to the first embodiment. The soft-switching inverter according to the present embodiment is the same as the soft-switching inverter according to the first embodiment except for the contents described below.

Figure 8:
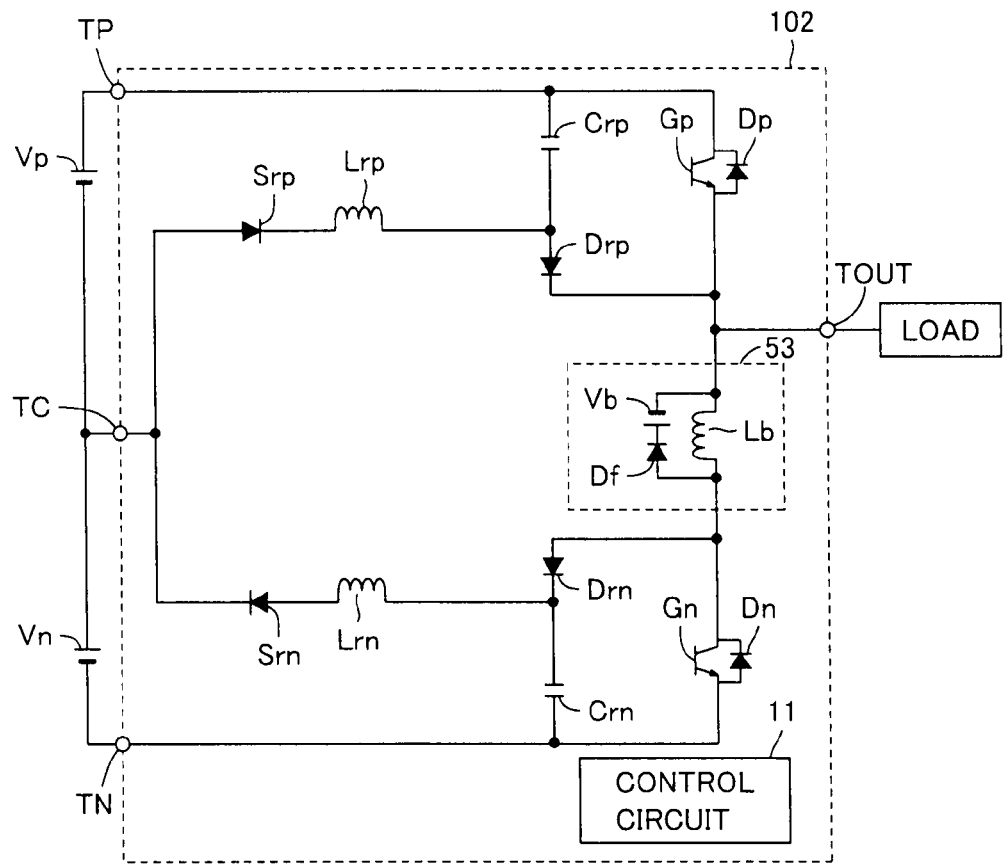
FIG. 8 is a diagram illustrating a configuration of a soft-switching inverter according to a second embodiment of the present invention.

FIG. 8 is a diagram illustrating a configuration of a soft-switching inverter according to a second embodiment of the present invention.

Referring to FIG. 8, a soft-switching inverter 102 includes a protection circuit 53 instead of protection circuit 51, as compared with the soft-switching inverter according to the first embodiment of the present invention. Protection circuit 53 includes an anode reactor Lb, clamp diode Df, and DC power supply Vb. Anode reactor Lb has a first end connected to the emitter of main switch Gp, and a second end connected to the collector of main switch Gn. DC power supply Vb and clamp diode Df are connected in series with each other across anode reactor Lb. That is, DC power supply Vb has a positive electrode connected to a cathode of clamp diode Df, and a negative electrode connected to the first end of anode reactor Lb. Clamp diode Df has an anode connected to the second end of anode reactor Lb.

When the voltage applied to snubber capacitor Crp has reached a predetermined value or higher, or when the voltage applied to snubber capacitor Crn has reached a predetermined value or higher, protection circuit 53 causes the charging current that is about to flow to snubber capacitor Crp or snubber capacitor Crn from DC power supply Vp and DC power supply Vn to escape to DC power supply Vb by way of clamp diode Df.

In this way, the use of a transformer in the protection circuit can be eliminated. On the other hand, in the configuration including a transformer in the protection circuit as in the soft-switching inverter according to the first embodiment of the present invention, it is not necessary to separately provide a DC power supply, thus achieving a simplified configuration.

The soft-switching inverter is otherwise the same as the soft-switching inverter according to the first embodiment in terms of configuration and operations; thus, the detailed description thereof is not repeated herein.

<Third Embodiment>

The present embodiment relates to a soft-switching inverter in which anode reactors are additionally provided, as compared with the soft-switching inverter according to the first embodiment. The soft-switching inverter according to the present embodiment is the same as the soft-switching inverter according to the first embodiment except for the contents described below.

Figure 9:
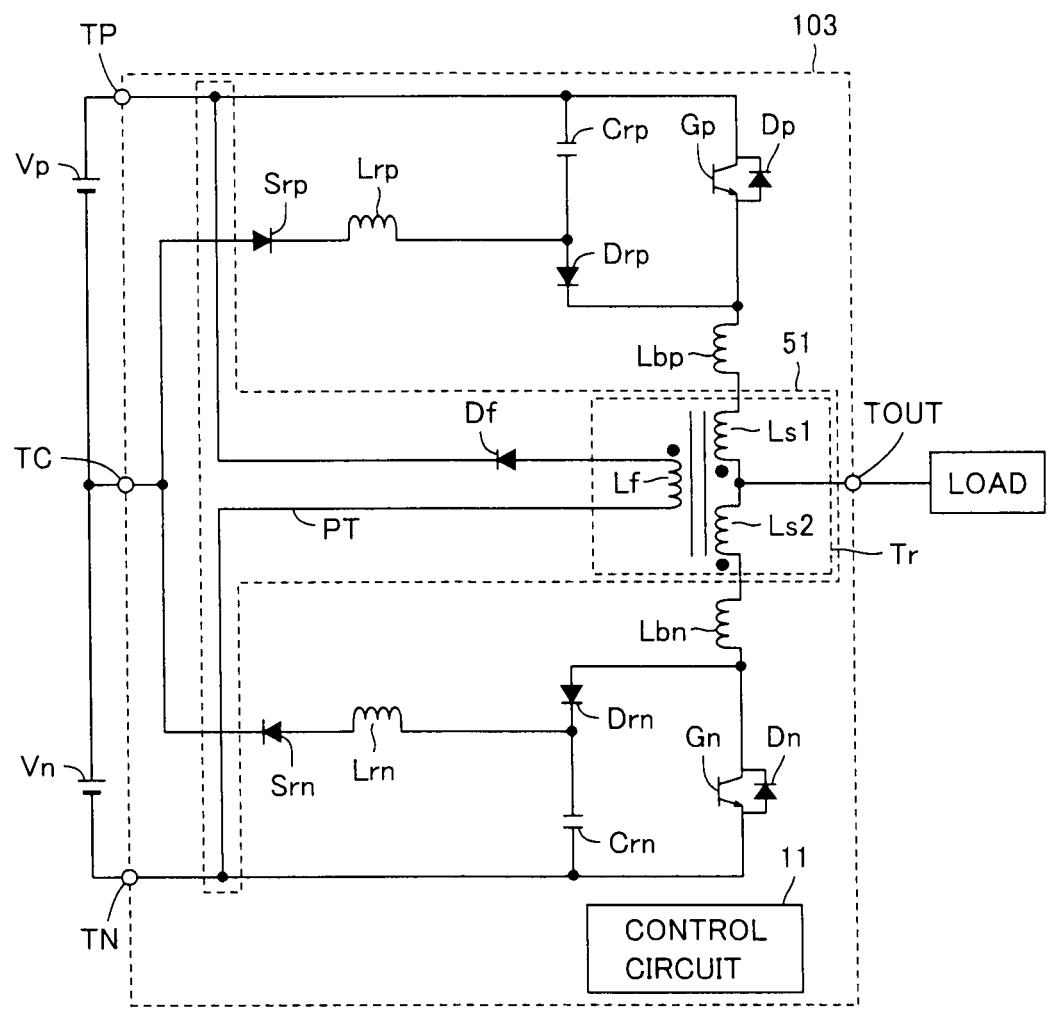
FIG. 9 is a diagram illustrating a configuration of a soft-switching inverter according to a third embodiment of the present invention.

FIG. 9 is a diagram illustrating a configuration of a soft-switching inverter according to a third embodiment of the present invention.

Referring to FIG. 9, a soft-switching inverter 103 further includes anode reactors Lbp, Lbn, as compared with the soft-switching inverter according to the first embodiment of the present invention.

Anode reactor Lbp has a first end connected to the cathode of snubber diode Drp, the emitter of main switch Gp, and the anode of main diode Dp, and a second end connected to the first end of primary winding Ls1. Anode reactor Lbn has a first end connected to the second end of primary winding Ls2, and a second end connected to the anode of snubber diode Drn, the collector of main switch Gn, and the cathode of main diode Dn.

The soft-switching inverter is otherwise the same as the soft-switching inverter according to the first embodiment in terms of configuration and operations; thus, the detailed description thereof is not repeated herein.

<Fourth Embodiment>

The present embodiment relates to a soft-switching inverter in which anode reactors are additionally provided, as compared with the soft-switching inverter according to the first embodiment. The soft-switching inverter according to the present embodiment is the same as the soft-switching inverter according to the first embodiment except for the contents described below.

Figure 10:
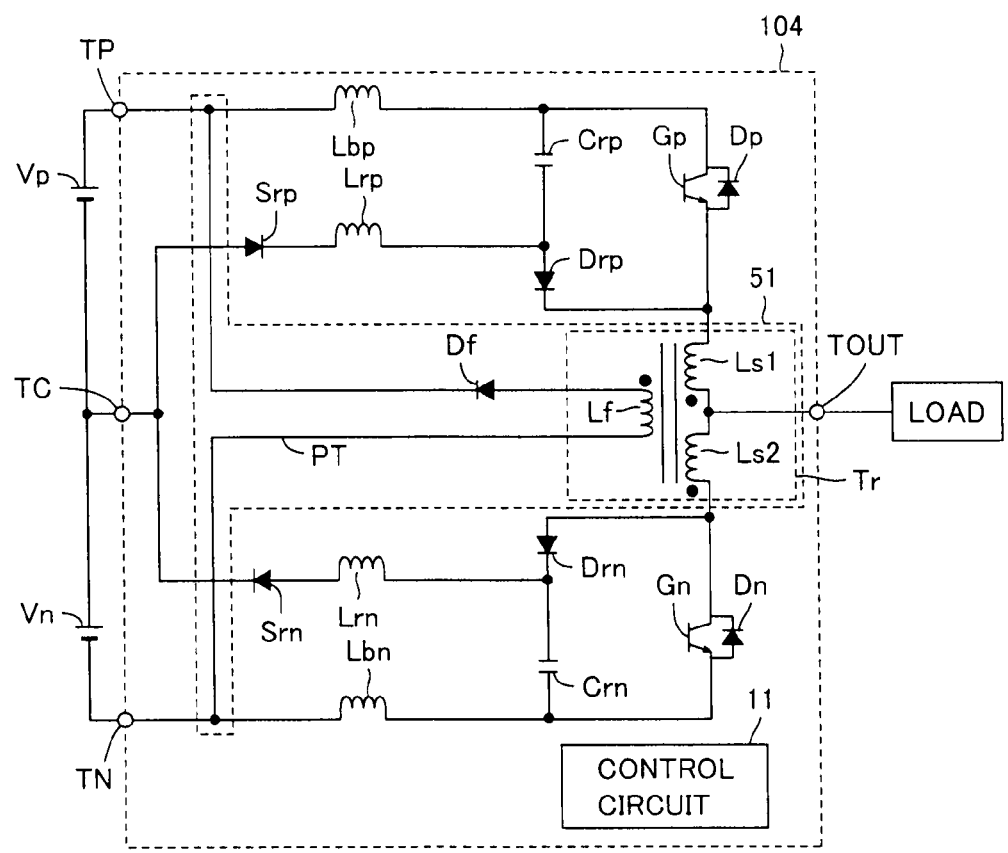
FIG. 10 is a diagram illustrating a configuration of a soft-switching inverter according to a fourth embodiment of the present invention.

FIG. 10 is a diagram illustrating a configuration of a soft-switching inverter according to a fourth embodiment of the present invention.

Referring to FIG. 10, a soft-switching inverter 104 further includes anode reactors Lbp, Lbn, as compared with the soft-switching inverter according to the first embodiment of the present invention.

Anode reactor Lbp has a first end connected to power supply terminal TP and the cathode of clamp diode Df, and a second end connected to the first end of snubber capacitor Crp, the collector of main switch Gp, and the cathode of main diode Dp. Anode reactor Lbn has a first end connected to power supply terminal TN and the second end of secondary winding Lf, and a second end connected to the second end of snubber capacitor Crn, the emitter of main switch Gn, and the anode of main diode Dn.

The soft-switching inverter is otherwise the same as the soft-switching inverter according to the first embodiment in terms of configuration and operations; thus, the detailed description thereof is not repeated herein.

<Fifth Embodiment>

The present embodiment differs from the first embodiment in terms of the timing of controlling auxiliary switches Srp, Srn to be turned on. The soft-switching inverter according to the present embodiment is the same as the soft-switching inverter according to the first embodiment except for the contents described below. Thus, the configuration of the soft-switching inverter according to the present embodiment is the same as that shown in FIG. 1.

Figure 11:
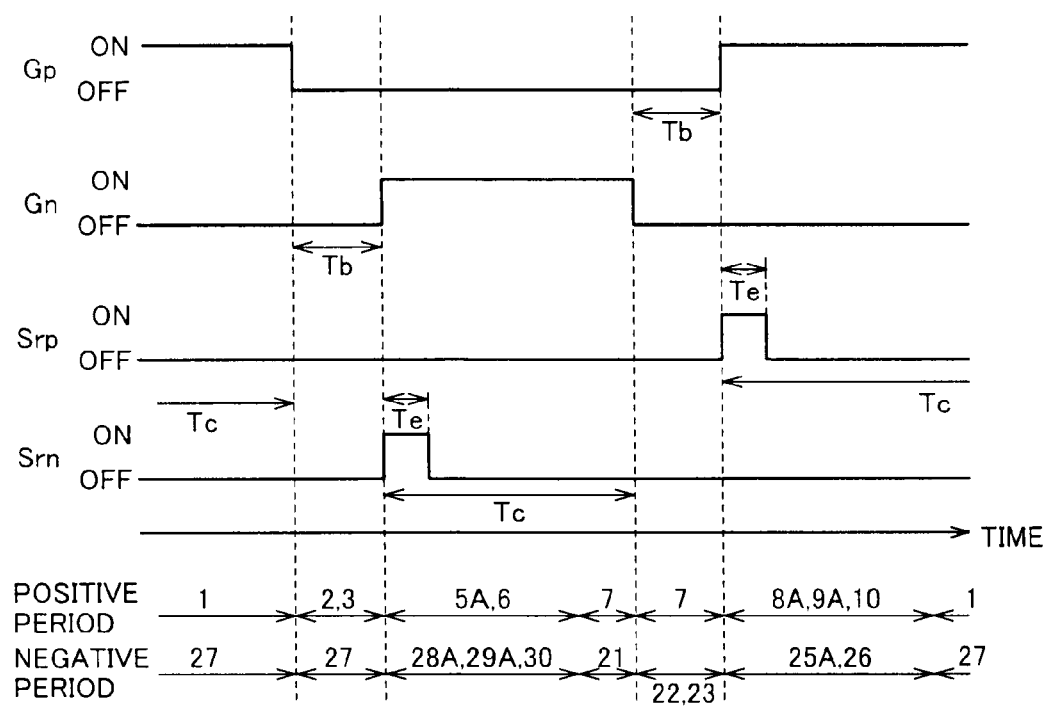
FIG. 11 is a diagram illustrating a switch control procedure during power conversion by the soft-switching inverter according to a fifth embodiment of the present invention.

FIG. 11 is a diagram illustrating a switch control procedure during power conversion by the soft-switching inverter according to a fifth embodiment of the present invention.

Referring to FIGS. 11 and 4, in the fifth embodiment, control circuit 11 controls main switch Gp and auxiliary switch Srp to be turned on simultaneously. Similarly, control circuit 11 controls main switch Gn and auxiliary switch Srn to be turned on simultaneously. Switching control according to the fifth embodiment differs in this respect from the switching control according to the first embodiment.

ON-time period of auxiliary switch Srp and ON-time period of auxiliary switch Srn are defined as Te. Time period Tc from the time when auxiliary switch Srp is controlled to be turned on until the time when main switch Gp is controlled to be turned off is equal to the ON-time period of main switch Gp. Similarly, time period Tc from the time when auxiliary switch Srn is controlled to be turned on until the time when main switch Gn is controlled to be turned off is equal to the ON-time period of main switch Gn.

Operations of the soft-switching inverter according to the fifth embodiment also differ in the following respect from those of the soft-switching inverter according to the first embodiment. With respect to operations during the positive period, the operations at steps 4, 11, and 12 are omitted, and the operations at steps 5, 8, and 9 are replaced with operations at steps 5A, 8A, and 9A, respectively. Similarly, with respect to operations during the negative period, the operations at steps 24, 31, and 32 are omitted, and the operations at steps 25, 28, and 29 are replaced with operations at steps 25A, 28A, and 29A, respectively.

The operations of the soft-switching inverter according to the fifth embodiment will be described in detail below, particularly with respect to the operations at steps 5A, 8A, 9A, 25A, 28A, and 29A. The operations of the soft-switching inverter at the other steps shown in FIG. 11 are the same as those at the corresponding steps shown in FIGS. 2, 3, 5, and 6, and hence the detailed description thereof will not be repeated hereinbelow.

[Operations During Positive Period]

Figure 12:
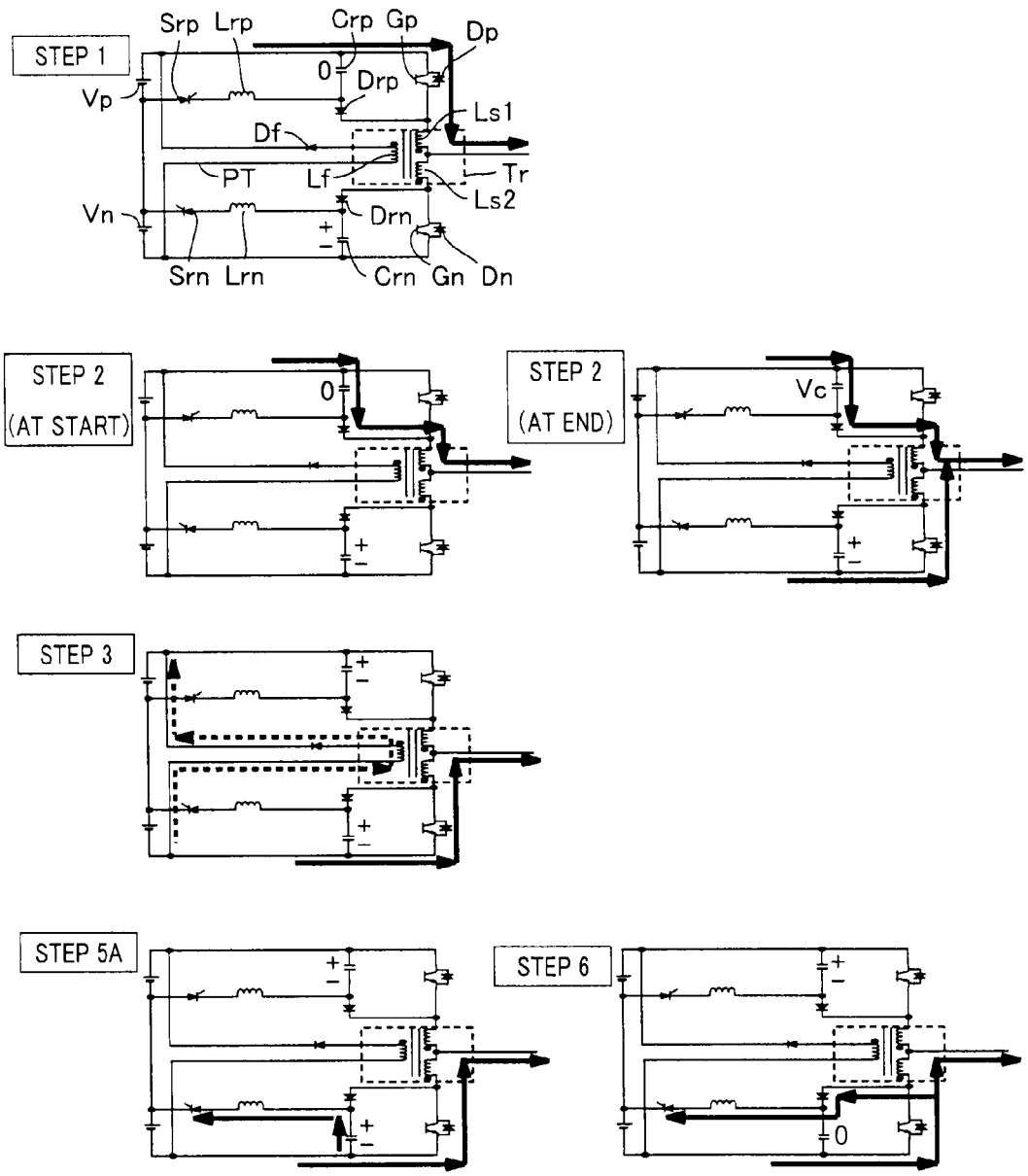
FIG. 12 is a diagram illustrating current flow in time sequence during power conversion by the soft-switching inverter according to the fifth embodiment of the present invention.
Figure 13:
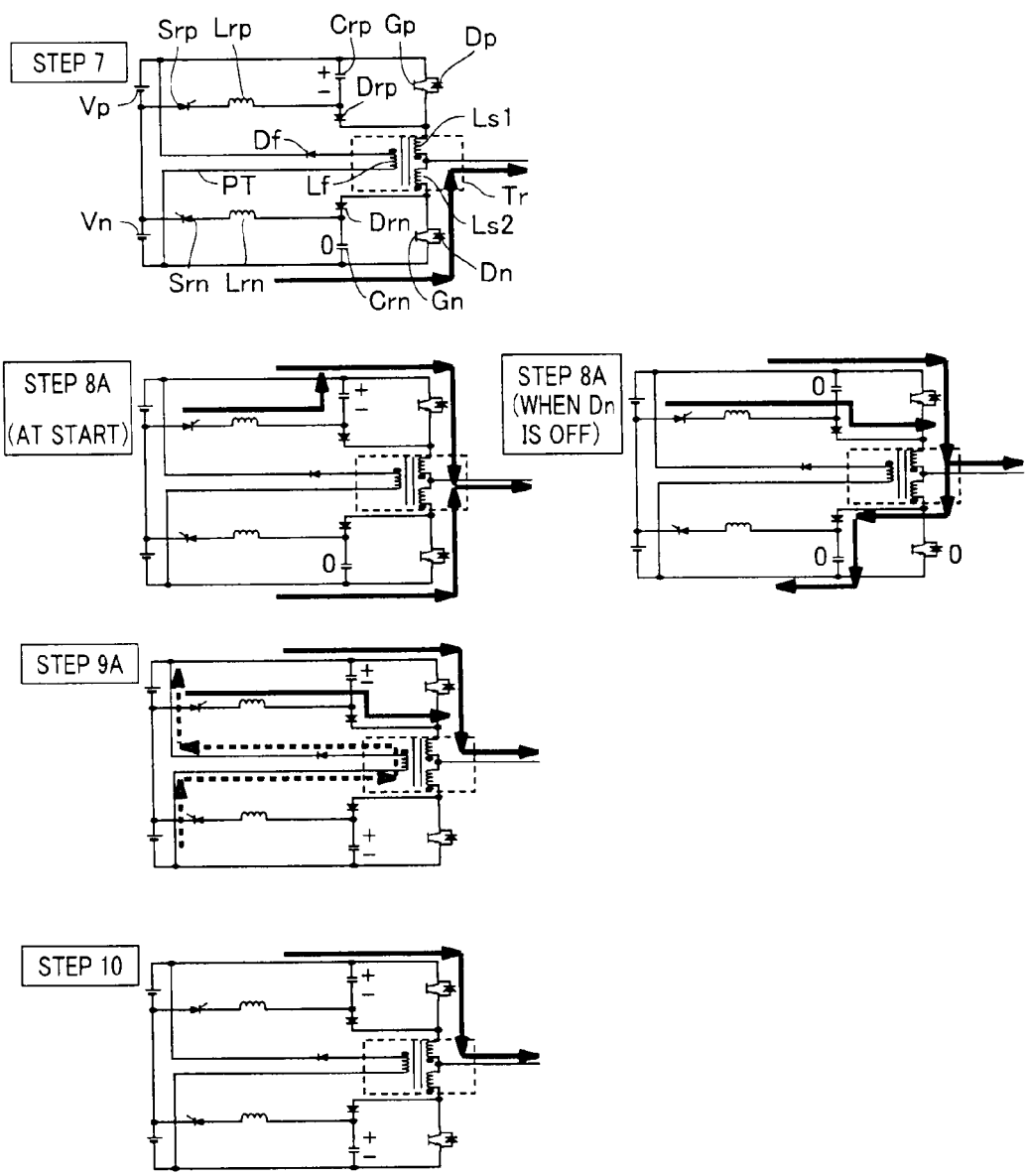
FIG. 13 is a diagram illustrating current flow in time sequence during power conversion by the soft-switching inverter according to the fifth embodiment of the present invention.

FIGS. 12 and 13 are diagrams each illustrating current flow in time sequence during power conversion by the soft-switching inverter according to the fifth embodiment of the present invention.

Referring to FIGS. 11, 12, and 13, the operations at steps 1 and 2 are carried out first. This completes commutation from main switch Gp to main diode Dn, i.e., commutation through current path PT (step 3).

Next, after predetermined time period Tb has elapsed since controlling main switch Gp to be turned off, main switch Gn and auxiliary switch Srn are controlled to be turned on simultaneously. At this time, main switch Gn does not become conducting, and current continues to flow to the load through main diode Dn, thus realizing zero-current switching. Further, snubber capacitor Crn begins to discharge. When the discharge is completed and the voltage across snubber capacitor Crn reaches zero, snubber diode Drn becomes conducting (step 5A).

Subsequent to the operation at step 5A, the operations at steps 6 and 7 are carried out. After the operation at step 7, the operation at step 8A is carried out. Specifically, after predetermined time period Tb has elapsed since controlling main switch Gn to be turned off, main switch Gp and auxiliary switch Srp are controlled to be turned on simultaneously. This causes commutation from main diode Dn to main switch Gp.

Current flowing from DC power supply Vp through main switch Gp is then increased to become equal to the load current, and simultaneously current flowing through main diode Dn reaches zero to turn off main diode Dn, thus completing this commutation (step 8A).

At the moment when main diode Dn is turned off, snubber diode Drn becomes conducting. At this time, since the electric charges in snubber capacitor Crn are zero, the current flowing from DC power supply Vp through main switch Gp flows to snubber capacitor Crn. That is, since no voltage is applied to main diode Dn, no switching loss is produced in main diode Dn. In this way, zero-voltage switching is realized. Further, at the time point of start of step 8A, auxiliary switch Srp is controlled to be turned on to thereby start conduction, and simultaneously snubber capacitor Crp begins to discharge. When the discharge is completed and the voltage across snubber capacitor Crp reaches zero, snubber diode Drp becomes conducting. Once snubber diode Drp becomes conducting, voltage from DC power supply Vp is applied to auxiliary reactor Lrp (step 8A).

Owing to the resonance of snubber capacitor Crn with excitation inductance of primary windings Ls1 and Ls2, current flowing to snubber diode Drn from snubber capacitor Crn begins to decrease.

Further, snubber capacitor Crn is charged by the resonant current between snubber capacitor Crn and excitation inductance of primary windings Ls1 and Ls2 of transformer Tr. At this time, the voltage corresponding to a difference between the output voltage (Vp+Vn) of DC power supplies Vp and Vn and voltage Vc across snubber capacitor Crn is applied to the series circuit of primary winding Ls1 and Ls2 of transformer Tr. A voltage half the above-mentioned differential voltage is applied to each of primary windings Ls1 and Ls2. That is, value VL of the voltage applied to each of primary windings Ls1 and Ls2 is expressed by the following equation:

$$VL=\{(Vp+Vn)-Vc\}/2$$

Since transformer Tr has a turns ratio of 1:n, a voltage of n×VL is induced to the secondary side. When voltage Vc across snubber capacitor Crn rises and the voltage on the secondary side of transformer Tr reaches the output voltage (Vp+Vn), clamp diode Df is turned on and snubber diode Drn is turned off (step 9A).

At this time, maximum value VM of voltage Vc is expressed by the following equation:

$$VM=(1+2/n)\times(Vp+Vn)$$

Then, current flows as shown by the dashed line shown in step 9A in FIG. 13, and hence current flowing to snubber capacitor Crn reaches zero and snubber capacitor Crn is no longer charged. Thus, voltage Vc across snubber capacitor Crn is clamped to VM. After the current flowing through clamp diode Df decreases to reach zero in time, clamp diode Df is turned off, thus ending the commutation through current path PT (step 9A).

Current from DC power supply Vp flows through main switch Gp to the load (step 10). Further, current flowing through auxiliary switch Srp attenuates to zero. Once the current has reached zero, auxiliary switch Srp and snubber diode Drp are both turned off. Therefore, the operation of the soft-switching inverter returns to step 1.

[Operations During Negative Period]

Figure 14:
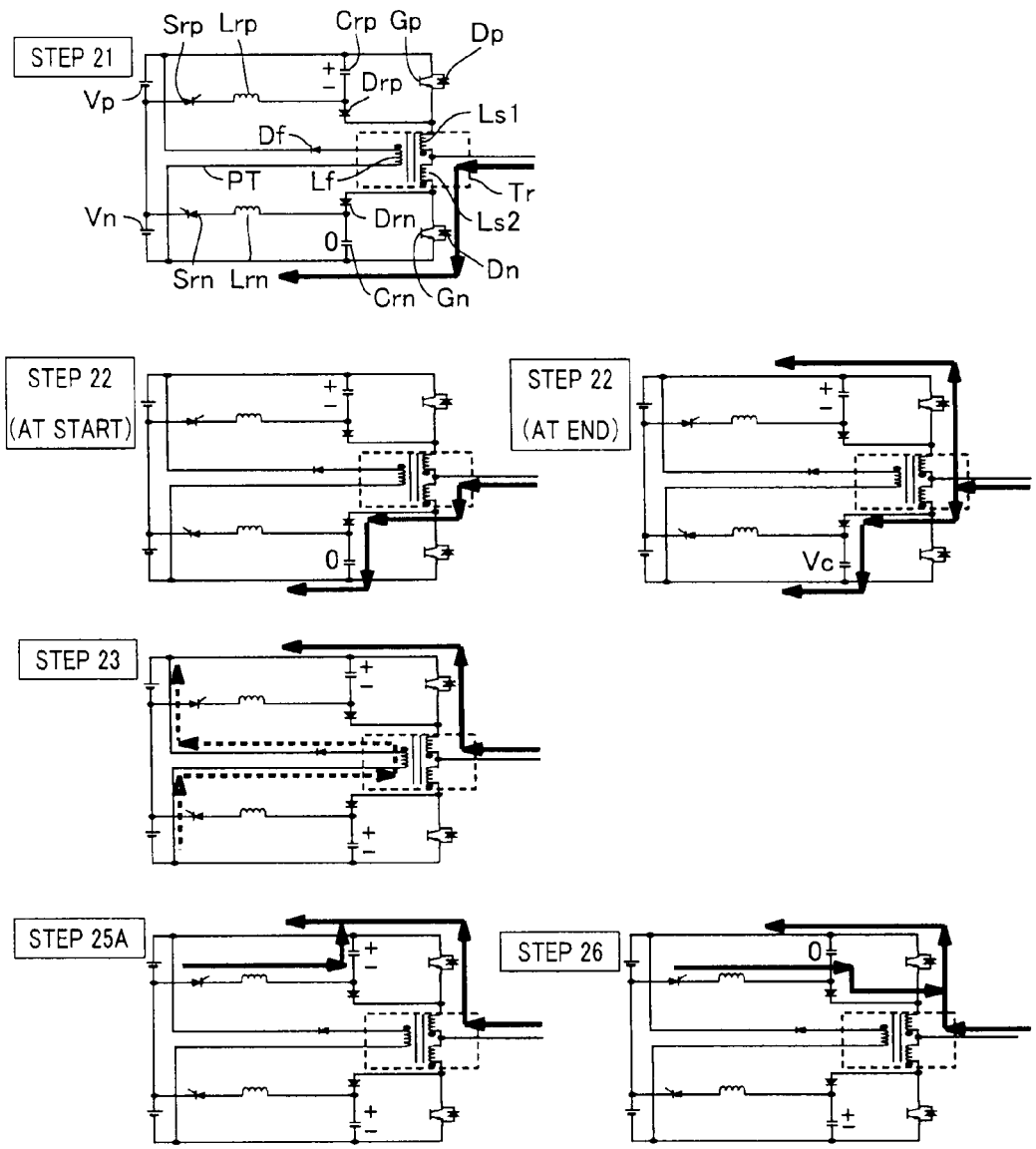
FIG. 14 is a diagram illustrating current flow in time sequence during power conversion by the soft-switching inverter according to the fifth embodiment of the present invention.
Figure 15:
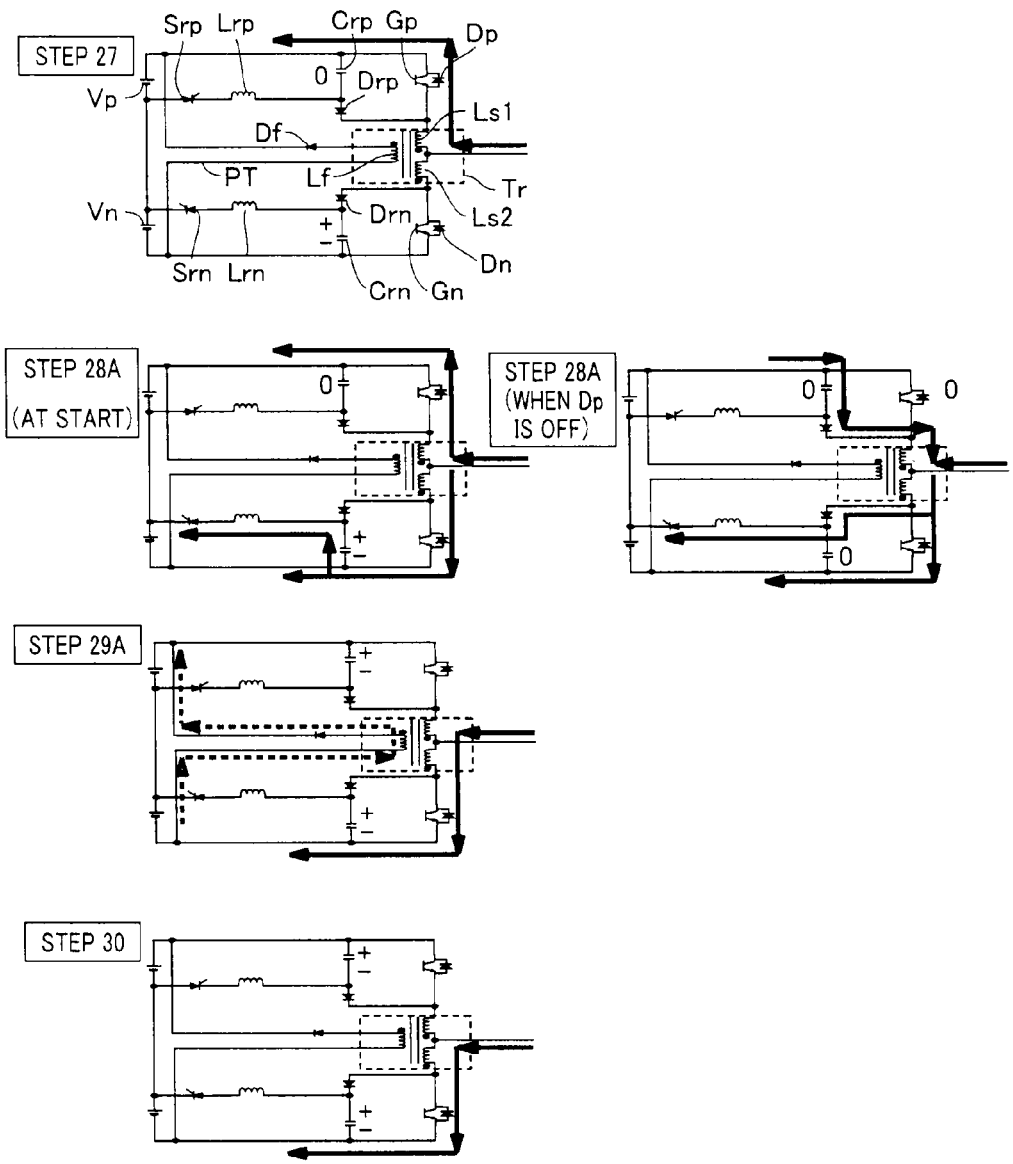
FIG. 15 is a diagram illustrating current flow in time sequence during power conversion by the soft-switching inverter according to the fifth embodiment of the present invention.

FIGS. 14 and 15 are diagrams each illustrating current flow in time sequence during power conversion by the soft-switching inverter according to the fifth embodiment of the present invention.

Referring to FIGS. 11, 14, and 15, the operations at steps 21, 22, and 23 are successively carried out first. At the time of start of step 22, when main switch Gn is controlled to be turned off, current flows to snubber capacitor Crn. Since the electric charges in snubber capacitor Crn are zero when main switch Gn is turned off, no voltage is applied to main switch Gn. In this way, zero-voltage switching is realized.

Next, after predetermined time period Tb has elapsed since controlling main switch Gn to be turned off, main switch Gp and auxiliary switch Srp are controlled to be turned on simultaneously. At this time, main switch Gp does not become conducting, and current continues to flow to DC power supply Vp through main diode Dp, thus realizing zero-current switching. Further, snubber capacitor Crp begins to discharge. When the discharge is completed and the voltage across snubber capacitor Crp reaches zero, snubber diode Drp becomes conducting (step 25A).

Subsequent to the operation at step 25A, the operations at steps 26 and 27 are carried out. After the operation at step 27, the operation at step 28A is carried out. Specifically, after predetermined time period Tb has elapsed since controlling main switch Gp to be turned off, main switch Gn and auxiliary switch Srn are controlled to be turned on simultaneously. This causes commutation from main diode Dp to main switch Gn. Current flowing from DC power supply Vn through main switch Gn is then increased to become equal to the load current, and simultaneously current flowing through main diode Dp reaches zero to turn off main diode Dp, thus completing this commutation (step 28A).

At the moment when main diode Dp is turned off, snubber diode Drp becomes conducting. At this time, since the electric charges in snubber capacitor Crp are zero, the current flowing from DC power supply Vp flows to snubber capacitor Crp. That is, since no voltage is applied to main diode Dp, no switching loss is produced in main diode Dp. In this way, zero-voltage switching is realized. Further, at the start point of step 28A, auxiliary switch Srn is controlled to be turned on to thereby start conduction, and simultaneously snubber capacitor Crn begins to discharge. When the discharge is completed and the voltage across snubber capacitor Crn reaches zero, snubber diode Drn becomes conducting. Once snubber diode Drn becomes conducting, voltage from DC power supply Vn is applied to auxiliary reactor Lrn (step 28A).

Owing to the resonance of snubber capacitor Crp with excitation inductance of primary windings Ls1 and Ls2, current flowing to snubber diode Drp from snubber capacitor Crp begins to decrease.

Further, snubber capacitor Crp is charged by the resonant current between snubber capacitor Crp and excitation inductance of primary windings Ls1 and Ls2 of transformer Tr. At this time, the voltage corresponding to a difference between the output voltage (Vn+Vp) of DC power supplies Vn and Vp and voltage Vc across snubber capacitor Crp is applied to the series circuit of primary winding Ls1 and Ls2 of transformer Tr. A voltage half the above-mentioned differential voltage is applied to each of primary windings Ls1 and Ls2. That is, value VL of the voltage applied to each of primary windings Ls1 and Ls2 is expressed by the following equation:

$$VL=\{(Vn+Vp)-Vc\}/2$$

Since transformer Tr has a turns ratio of 1:n, a voltage of n×VL is induced to the secondary side. When voltage Vc across snubber capacitor Crp rises and the voltage on the secondary side of transformer Tr reaches the output voltage (Vn+Vp), clamp diode Df is turned on and snubber diode Drp is turned off. At this time, maximum value VM of voltage Vc is expressed by the following equation:

$$VM=(1+2/n)\times(Vn+Vp)$$

Then, current flows as shown by the dashed line shown in step 29 in FIG. 6, and hence current flowing to snubber capacitor Crp reaches zero and snubber capacitor Crp is no longer charged. Thus, voltage Vc across snubber capacitor Crp is clamped to VM. After the current flowing through clamp diode Df decreases to reach zero in time, clamp diode Df is turned off, thus ending the commutation through current path PT (step 29A).

Current from the load flows through main switch Gn to DC power supply Vn (step 10). Further, current flowing through auxiliary switch Srn attenuates to zero. Once the current has reached zero, auxiliary switch Srp and snubber diode Drn are both turned off. Therefore, the operation of the soft-switching inverter returns to step 21.

As described above, according to the fifth embodiment of the present invention, after a predetermined time period has elapsed since controlling main switch Gp to be turned off, control circuit 11 controls main switch Gn and auxiliary switch Srn to be turned on simultaneously. Similarly, after a predetermined time period has elapsed since controlling main switch Gn to be turned off, control circuit 11 controls main switch Gp and auxiliary switch Srp to be turned on simultaneously. This enables control more simplified than the switching control according to the first embodiment.

Furthermore, as shown in FIG. 16, main switch Gp and auxiliary switch Srp may be controlled to be turned on and off simultaneously, and main switch Gn and auxiliary switch Srn may also be controlled to be turned on and off simultaneously. The operations of the soft-switching inverter in this case are the same as those shown in FIGS. 12 to 15. When the switching control shown in FIG. 16 is carried out by control circuit 11, the control by control circuit 11 can be further simplified.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST

11: control circuit; 51, 52, and 53: protection circuit; 101: soft-switching inverter (power conversion apparatus); Vp, Vn: DC power supply; TP, TC, and TN: power supply terminal; TOUT: AC output terminal; Gp, Gn: main switch; Dp, Dn: main diode; Crp, Crn: snubber capacitor; Drp, Drn: snubber diode; Srp, Srn: auxiliary switch; Lrp, Lrn: auxiliary reactor; Tr: transformer; Df: clamp diode; Ls1, Ls2: primary winding; Lf: secondary winding; Vb: DC power supply; and Lb, Lbp, Lbn: anode reactor.

The invention claimed is:

1. A power conversion apparatus for converting DC power, supplied from a first DC power supply having a first electrode and a second electrode and from a second DC power supply having a first electrode connected to the second electrode of said first DC power supply and a second electrode, into AC power, and supplying the AC power to a load, comprising:
a first main switch having a first end coupled to the first electrode of said first DC power supply and a second end coupled to said load;
a first main diode connected in parallel with said first main switch, so as to have a direction of conduction reverse to that of said first main switch;
a first snubber capacitor connected in parallel with said first main switch and said first main diode;
a first snubber diode connected in series with said first snubber capacitor, so as to have a direction of conduction identical to that of said first main switch, and connected between said first snubber capacitor and the second end of said first main switch;
a first auxiliary switch and a first auxiliary reactor connected between a connection node of said first DC power supply and said second DC power supply and a connection node of said first snubber capacitor and said first snubber diode, and connected in series with each other;
a second main switch having a first end coupled to the second end of said first main switch and a second end coupled to the second electrode of said second DC power supply, and provided so as to have a direction of conduction identical to that of said first main switch;
a second main diode connected in parallel with said second main switch, so as to have a direction of conduction reverse to that of said second main switch;
a second snubber capacitor connected in parallel with said second main switch and said second main diode;
a second snubber diode connected in series with said second snubber capacitor, so as to have a direction of conduction identical to that of said second main switch, and connected between said second snubber capacitor and the first end of said second main switch;
a second auxiliary switch and a second auxiliary reactor connected between a connection node of said first DC power supply and said second DC power supply with said first auxiliary switch or said first auxiliary reactor and a connection node of said second snubber capacitor and said second snubber diode, and connected in series with each other;
a protection circuit for causing, when voltage applied to said first snubber capacitor has reached a predetermined value or higher, or when voltage applied to said second snubber capacitor has reached a predetermined value or higher, charging current that is about to flow to said first snubber capacitor or said second snubber capacitor from said first DC power supply and said second DC power supply to flow to another current path; and
a control circuit for controlling said first main switch, said second main switch, said first auxiliary switch, and said second auxiliary switch to be turned on and off;
said control circuit, during a positive period in which current flows from said power conversion apparatus to said load, causing said second snubber capacitor to discharge by controlling said second auxiliary switch to be turned on while said second main diode is turned on, and during a negative period in which current flows from said load to said power conversion apparatus, causing said first snubber capacitor to discharge by controlling said first auxiliary switch (Srp) to be turned on while said first main diode is turned on.

2. The power conversion apparatus according to claim 1, wherein
said control circuit controls said second main switch to be turned on after a predetermined time period has elapsed since controlling said first main switch to be turned off, controls said second auxiliary switch to be turned on after a predetermined time period has elapsed since controlling said second main switch to be turned on, controls said second main switch to be turned off after a predetermined time period has elapsed since controlling said second auxiliary switch to be turned on, controls said first main switch to be turned on after a predetermined time period has elapsed since controlling said second main switch to be turned off, controls said first auxiliary switch to be turned on after a predetermined time period has elapsed since controlling said first main switch to be turned on, and controls said first main switch to be turned off after a predetermined time period has elapsed since controlling said first auxiliary switch to be turned on.

3. The power conversion apparatus according to claim 1, wherein said control circuit controls said second main switch and said second auxiliary switch to be turned on simultaneously after a predetermined time period has elapsed since controlling said first main switch to be turned off, controls said second main switch to be turned off after controlling said second auxiliary switch to be turned off, controls said first main switch and said first auxiliary switch to be turned on simultaneously after a predetermined time period has elapsed since controlling said second main switch to be turned off, and controls said first main switch to be turned off after controlling said first auxiliary switch to be turned off.

4. The power conversion apparatus according to claim 1, wherein said control circuit controls said second main switch and said second auxiliary switch to be turned on simultaneously after a predetermined time period has elapsed since controlling said first main switch to be turned off, controls said second main switch and said second auxiliary switch to be turned off simultaneously after a predetermined on-period has elapsed, controls said first main switch and said first auxiliary switch to be turned on simultaneously after a predetermined time period has elapsed since controlling said second main switch and said second auxiliary switch to be turned off, and controls said first main switch and said first auxiliary switch to be turned off simultaneously after a predetermined on-period has elapsed.

\* \* \* \* \*